US012812674B2

(12) United States Patent
Ratnam et al.

(10) Patent No.: US 12,812,674 B2
(45) Date of Patent: Nov. 24, 2026

(54) SYNCHRONIZING OBSS TRANSMISSIONS FOR MULTI-AP COORDINATION

(71) Applicant: Samsung Electronics Co., Ltd., Suwon-si (KR)

(72) Inventors: Vishnu Vardhan Ratnam, Plano, TX (US); Peshal Nayak, Plano, TX (US); Rubayet Shafin, Allen, TX (US); Boon Loong Ng, Plano, TX (US); Abhishek Sehgal, Frisco, TX (US); Yue Qi, Plano, TX (US); Elliot Jen, Taipei City (TW)

(73) Assignee: Samsung Electronics Co., Ltd., Suwon-si (KR)

( * ) Notice: Subject to any disclaimer, the term of this patent is extended or adjusted under 35 U.S.C. 154(b) by 250 days.

(21) Appl. No.: 18/635,218

(22) Filed: Apr. 15, 2024

(65) Prior Publication Data

US 2024/0365379 A1 Oct. 31, 2024

Related U.S. Application Data

(60) Provisional application No. 63/461,834, filed on Apr. 25, 2023.

(51) Int. Cl.
*H04W 74/0808* (2024.01)
*H04B 17/318* (2015.01)
(Continued)

(52) U.S. Cl.
CPC ...... *H04W 74/0808* (2013.01); *H04B 17/328* (2023.05); *H04W 74/04* (2013.01); *H04W 74/0891* (2013.01)

(58) Field of Classification Search
CPC ............ H04W 74/0808; H04W 74/04; H04W 74/0891; H04W 74/002; H04W 84/12; H04W 72/0453; H04B 17/328
See application file for complete search history.

(56) References Cited

U.S. PATENT DOCUMENTS

2020/0229086 A1* 7/2020 Monajemi ............ H04W 72/20
2021/0120427 A1 4/2021 Wang et al.
(Continued)

FOREIGN PATENT DOCUMENTS

CN 109672492 A 4/2019
EP 3820225 A1 5/2021
(Continued)

OTHER PUBLICATIONS

International Search Report and Written Opinion issued Jul. 31, 2024 regarding International Application No. PCT/KR2024/005524, 8 pages.
(Continued)

*Primary Examiner* — Thai Nguyen

(57) ABSTRACT

Methods and apparatuses for synchronizing overlapping basic service set (OBSS) transmissions for multi-access point (AP) coordination. A method of wireless communication performed by a first access point (AP) includes: determining, based on one or more conditions placed on performance of multi-AP coordination, whether multi-AP coordination can be performed between the first AP and a second AP of a plurality of APs; when the one or more conditions is satisfied, performing the multi-AP coordination between the first AP and the second AP; and when the one or more conditions is not satisfied, not performing the multi-AP coordination between the first AP and the second AP.

18 Claims, 16 Drawing Sheets

(51) Int. Cl.

| | |
|---|---|
| ***H04W 74/04*** | (2009.01) |
| ***H04W 74/08*** | (2009.01) |

(56) References Cited

U.S. PATENT DOCUMENTS

| | | | | |
|---|---|---|---|---|
| 2021/0289499 | A1* | 9/2021 | Naribole | H04W 72/0453 |
| 2022/0408355 | A1 | 12/2022 | Shafin et al. | |
| 2022/0417847 | A1 | 12/2022 | Cariou et al. | |
| 2023/0388920 | A1 | 11/2023 | Solaija et al. | |

FOREIGN PATENT DOCUMENTS

| | | | | | |
|---|---|---|---|---|---|
| EP | 3820255 | A1 * | 5/2021 | H05B 47/115 |
| EP | 3989452 | A1 | 4/2022 | |
| WO | WO-2020097487 | A1 * | 5/2020 | H04B 7/024 |

OTHER PUBLICATIONS

IEEE Standard for Information Technology—Telecommunications and Information Exchange between Systems—Local and Metropolitan Area Networks—Specific Requirements; "Part 11: Wireless LAN Medium Access Control (MAC) and Physical Layer (PHY) Specifications"; IEEE Std 802.11-2020; Dec. 2020; 4379 pages.

IEEE P802.11be-D3.0; Draft Standard for Information technology—Telecommunications and information exchange between systems Local and metropolitan area networks—Specific requirements; "Part 11: Wireless LAN Medium Access Control (MAC) and Physical Layer (PHY) Specifications—Amendment 8: Enhancements for extremely high throughput (EHT)"; Jan. 2023; 999 pages.

IEEE Standard for Information Technology—Telecommunications and information exchange between systems Local and metropolitan area networks—Specific requirements; "Part 11: Wireless LAN Medium Access Control (MAC) and Physical Layer (PHY) Specifications"; IEEE Std 802.11-2016; Dec. 2016, 3534 pages.

IEEE 802.11-23/19662r1; "Gain analysis for coordinated AP transmissions"; Nov. 2023, 7 pages.

IEEE 802.11-23/2022r0; "R-TWT for Multi-AP", Nov. 2023, 19 pages.

Supplementary European Search Report dated Mar. 24, 2026, in connection with European Patent Application No. 24797396.9, 9 pages.

Lu et al., "Multi-AP Operation for Low Latency Traffic Delivery—Follow up," IEEE 802.11-22/1899r0, OPPO, Nov. 6, 2022, 10 pages.

* cited by examiner

520

| | Multi-AP coordination supported | Minimum multi-AP received power | Non-overlapping primary channel support | Reserved |
|---|---|---|---|---|
| Bits: | 1 | 4 | 1 | 2 |

SYNCHRONIZING OBSS TRANSMISSIONS FOR MULTI-AP COORDINATION

CROSS-REFERENCE TO RELATED APPLICATION(S) AND CLAIM OF PRIORITY

This application claims priority under 35 U.S.C. § 119(e) to U.S. Provisional Patent Application No. 63/461,834 filed on Apr. 25, 2023, which is hereby incorporated by reference in its entirety.

TECHNICAL FIELD

This disclosure relates generally to wireless communications systems, and more particularly to synchronizing overlapping basic service set (OBSS) transmissions for multi-access point (AP) coordination.

BACKGROUND

Wireless local area network (WLAN) technology allows devices to access the internet in the 2.4 GHz, 5 GHZ, 6 GHz or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

To meet the ever-growing demand for data, the density of Wi-Fi networks is growing, causing BSSs that have an overlap in their respective operating channels to become closer to each other. Such BSSs, referred to as Overlapping BSS (OBSS), can interfere with each other causing several issues that impact end user experience.

SUMMARY

Embodiments of the present disclosure provide methods and apparatuses for synchronizing OBSS transmissions for multi-AP coordination.

In one embodiment, a method of wireless communication performed by a first access point (AP) includes determining, based on one or more conditions placed on performance of multi-AP coordination, whether multi-AP coordination can be performed between the first AP and a second AP of a plurality of APs; when the one or more conditions is satisfied, performing the multi-AP coordination between the first AP and the second AP; and when the one or more conditions is not satisfied, not performing the multi-AP coordination between the first AP and the second AP.

In another embodiment, a first access point (AP) device includes a transceiver, and a processor operably coupled to the transceiver. The processor is configured to: determine, based on one or more conditions placed on performance of multi-AP coordination, whether multi-AP coordination can be performed between the first AP and a second AP of a plurality of APs; when the one or more conditions is satisfied, perform the multi-AP coordination between the first AP and the second AP; and when the one or more conditions is not satisfied, not perform the multi-AP coordination between the first AP and the second AP.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: [1] IEEE std. 802.11-2020, "Wireless LAN Medium Access Control (MAC) and Physical Layer (PHY) Specification"; [2] IEEE P802.11be/D3.0.

Figure 1:
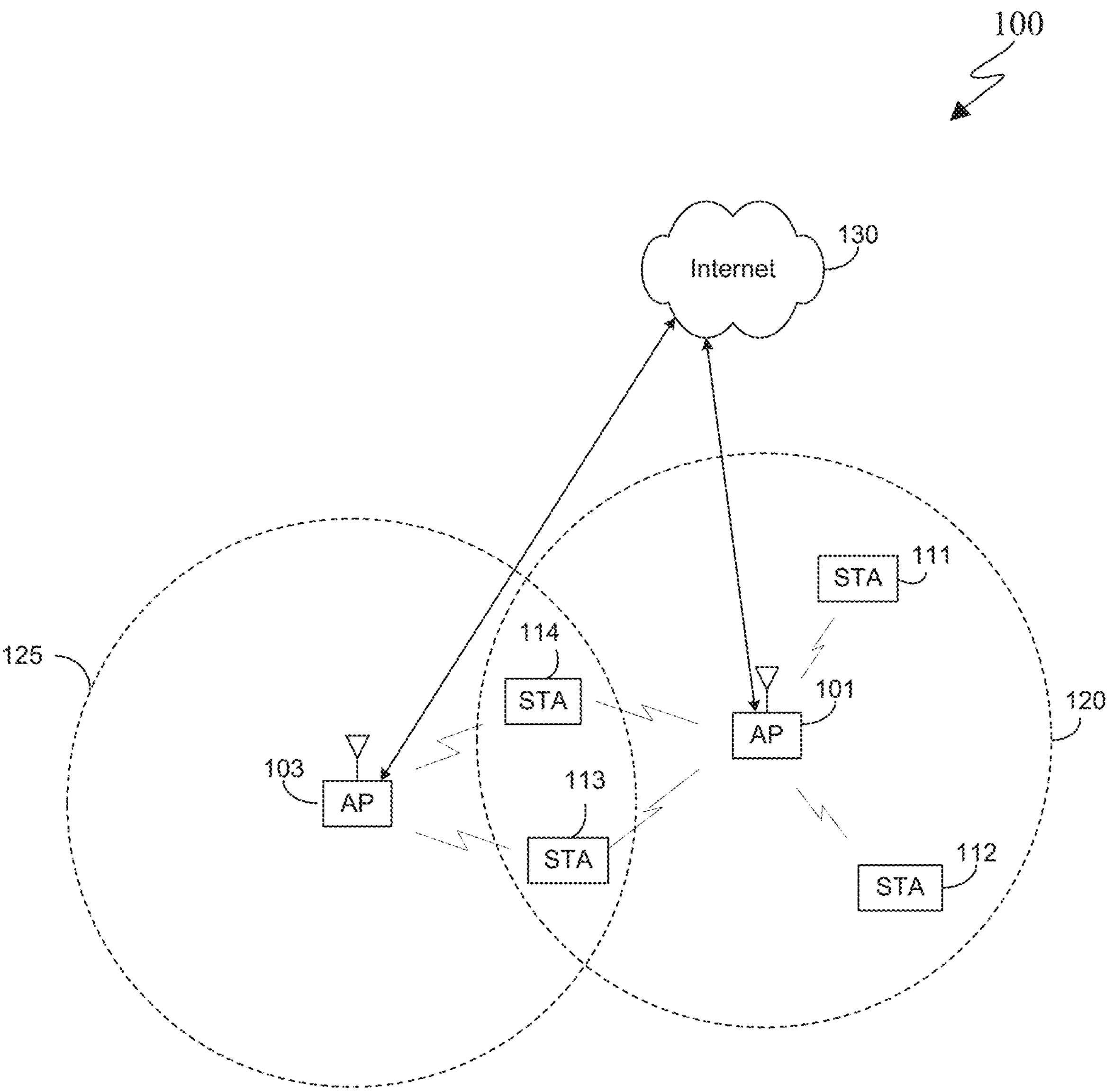
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using WI-FI or other WLAN communication techniques. The STAs 111-114 may communicate with each other using peer-to-peer protocols, such as Tunneled Direct Link Setup (TDLS).

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating synchronizing OBSS transmissions for multi-AP coordination. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or

103 could provide access to other or additional external networks, such as external telephone networks or other types of data networks.

Figure 2A:
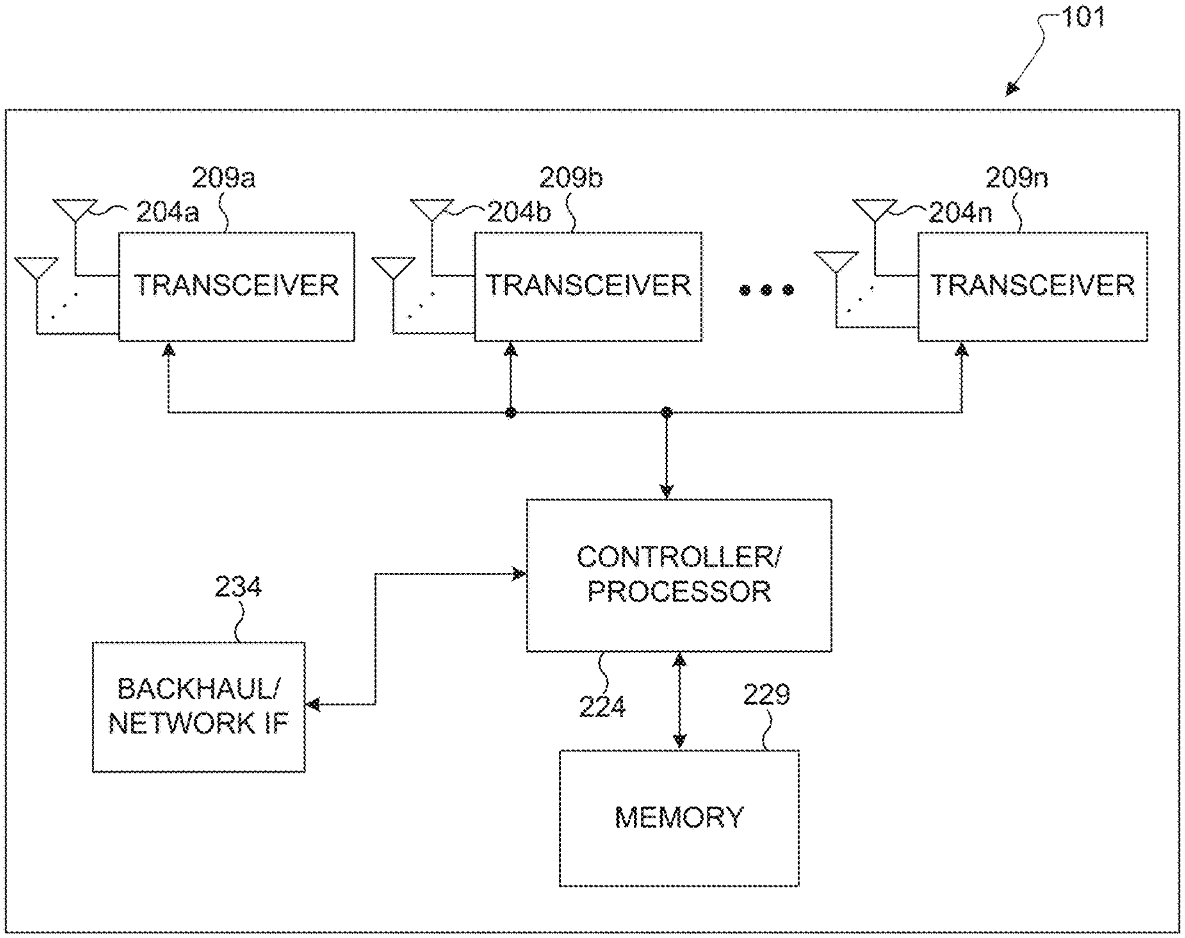
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIGURE I could have the same or similar configuration. However, APs come in a wide variety of configurations, and FIG. 2A does not limit the scope of this disclosure to any particular implementation of an AP.

The AP 101 includes multiple antennas 204*a*-204*n* and multiple transceivers 209*a*-209*n*. The AP 101 also includes a controller/processor 224, a memory 229, and a backhaul or network interface 234. The transceivers 209*a*-209*n* receive, from the antennas 204*a*-204*n*, incoming radio frequency (RF) signals, such as signals transmitted by STAs 111-114 in the network 100. The transceivers 209*a*-209*n* down-convert the incoming RF signals to generate IF or baseband signals. The IF or baseband signals are processed by receive (RX) processing circuitry in the transceivers 209*a*-209*n* and/or controller/processor 224, which generates processed baseband signals by filtering, decoding, and/or digitizing the baseband or IF signals. The controller/processor 224 may further process the baseband signals.

Transmit (TX) processing circuitry in the transceivers 209*a*-209*n* and/or controller/processor 224 receives analog or digital data (such as voice data, web data, e-mail, or interactive video game data) from the controller/processor 224. The TX processing circuitry encodes, multiplexes, and/or digitizes the outgoing baseband data to generate processed baseband or IF signals. The transceivers 209*a*-209*n* up-converts the baseband or IF signals to RF signals that are transmitted via the antennas 204*a*-204*n*.

The controller/processor 224 can include one or more processors or other processing devices that control the overall operation of the AP 101. For example, the controller/processor 224 could control the reception of forward channel signals and the transmission of reverse channel signals by the transceivers 209*a*-209*n* in accordance with well-known principles. The controller/processor 224 could support additional functions as well, such as more advanced wireless communication functions. For instance, the controller/processor 224 could support beam forming or directional routing operations in which outgoing signals from multiple antennas 204*a*-204*n* are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including facilitating synchronizing OBSS transmissions for multi-AP coordination. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for facilitating synchronizing OBSS transmissions for multi-AP coordination. Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. Alternatively, only one antenna and transceiver path may be included, such as in legacy APs. Also, various components in FIG. 2A could be combined, further subdivided, or omitted and additional components could be added according to particular needs.

Figure 2B:
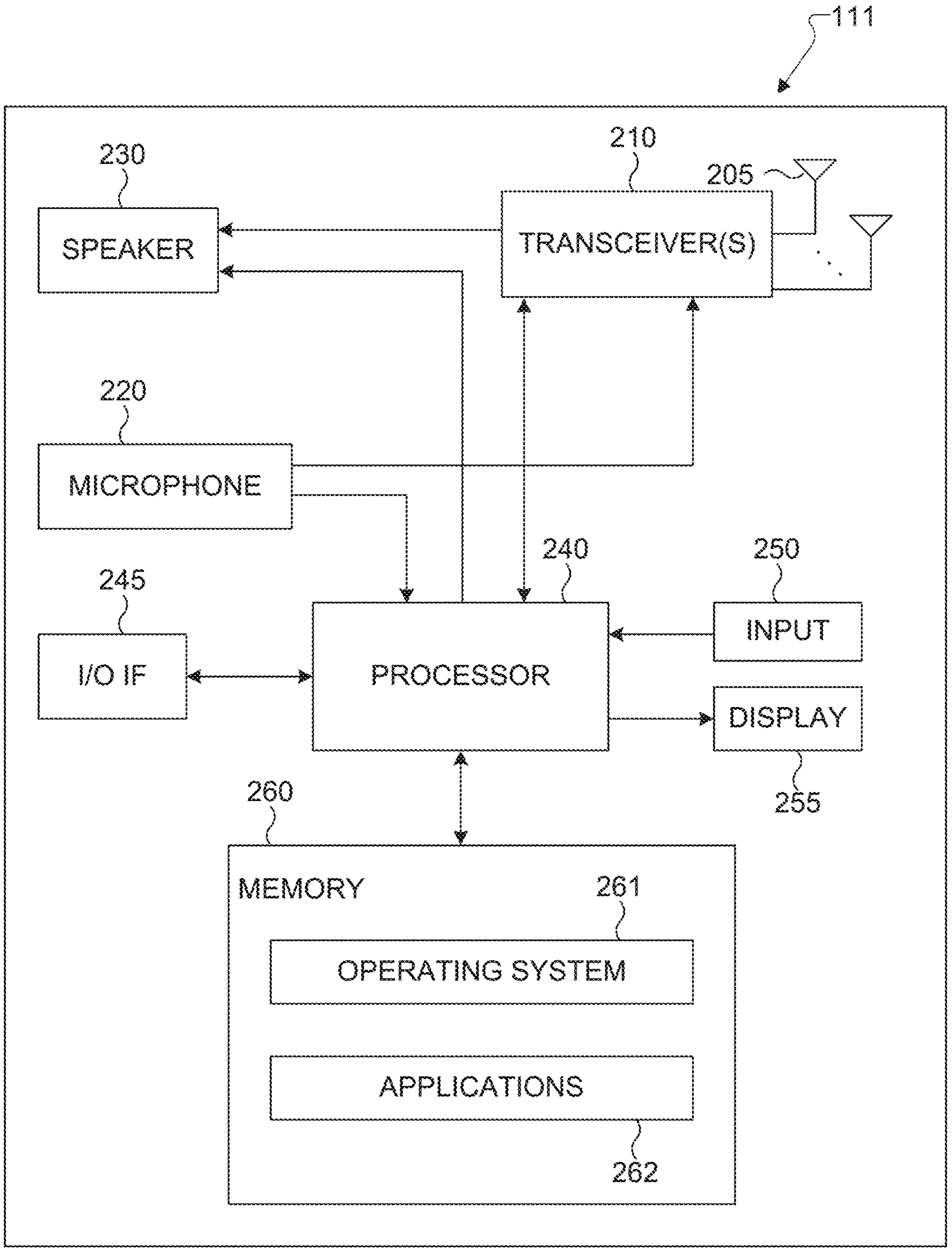
FIG. 2B illustrates an example STA according to various embodiments of the present disclosure.

FIG. 2B illustrates an example STA 111 according to various embodiments of the present disclosure. The embodiment of the STA 111 illustrated in FIG. 2B is for illustration only, and the STAs 111-115 of FIG. 1 could have the same or similar configuration. However, STAs come in a wide variety of configurations, and FIG. 2B does not limit the scope of this disclosure to any particular implementation of a STA.

The STA 111 includes antenna(s) 205, transceiver(s) 210, a microphone 220, a speaker 230, a processor 240, an input/output (I/O) interface (IF) 245, an input 250, a display 255, and a memory 260. The memory 260 includes an operating system (OS) 261 and one or more applications 262.

The transceiver(s) 210 receives, from the antenna(s) 205, an incoming RF signal (e.g., transmitted by an AP 101 of the network 100). The transceiver(s) 210 down-converts the incoming RF signal to generate an intermediate frequency (IF) or baseband signal. The IF or baseband signal is processed by RX processing circuitry in the transceiver(s) 210 and/or processor 240, which generates a processed baseband signal by filtering, decoding, and/or digitizing the baseband or IF signal. The RX processing circuitry sends the processed baseband signal to the speaker 230 (such as for voice data) or is processed by the processor 240 (such as for web browsing data).

TX processing circuitry in the transceiver(s) 210 and/or processor 240 receives analog or digital voice data from the microphone 220 or other outgoing baseband data (such as web data, e-mail, or interactive video game data) from the processor 240. The TX processing circuitry encodes, multiplexes, and/or digitizes the outgoing baseband data to generate a processed baseband or IF signal. The transceiver(s) 210 up-converts the baseband or IF signal to an RF signal that is transmitted via the antenna(s) 205.

The processor 240 can include one or more processors and execute the basic OS program 261 stored in the memory 260 in order to control the overall operation of the STA 111. In one such operation, the processor 240 controls the reception of forward channel signals and the transmission of reverse channel signals by the transceiver(s) 210 in accordance with well-known principles. The processor 240 can also include processing circuitry configured to facilitate synchronizing OBSS transmissions for multi-AP coordination. In some embodiments, the processor 240 includes at least one microprocessor or microcontroller.

The processor 240 is also capable of executing other processes and programs resident in the memory 260, such as operations for facilitating synchronizing OBSS transmissions for multi-AP coordination. The processor 240 can move data into or out of the memory 260 as required by an executing process. In some embodiments, the processor 240 is configured to execute a plurality of applications 262, such as applications for facilitating synchronizing OBSS transmissions for multi-AP coordination. The processor 240 can operate the plurality of applications 262 based on the OS program 261 or in response to a signal received from an AP. The processor 240 is also coupled to the I/O interface 245, which provides STA 111 with the ability to connect to other devices such as laptop computers and handheld computers. The I/O interface 245 is the communication path between these accessories and the processor 240.

The processor 240 is also coupled to the input 250, which includes for example, a touchscreen, keypad, etc., and the display 255. The operator of the STA 111 can use the input 250 to enter data into the STA 111. The display 255 may be a liquid crystal display, light emitting diode display, or other display capable of rendering text and/or at least limited graphics, such as from web sites. The memory 260 is coupled to the processor 240. Part of the memory 260 could include a random-access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

Various embodiments of the present disclosure recognize that in an infrastructure WiFi network, a basic service set (BSS) typically refers to a network topology including one access point (AP) or an AP multi-link device (MLD), and all the non-AP devices associated with that AP or AP MLD. Each BSS defines an operating bandwidth, that indicates the frequency resources that the devices belonging to the BSS can use for transmission, and rules on how the BSS devices can contend for this bandwidth. In particular, a WiFi BSS defines one of the 20 MHz channels of its operating bandwidth as the primary channel, and any device in that BSS is allowed to initiate transmission if the primary channel is sensed as IDLE (after performing a required random back-off). The transmission is normally restricted to that primary 20 MHz and the duration of the transmission is called a transmit opportunity (TXOP) duration. However, if any non-primary channel of the BSS (i.e., a 20 MHz channel that lies within the operating bandwidth but is not the primary channel) is also sensed as IDLE for a Point coordination function Inter Frame Spacing (PIFS) duration before the time when the transmit opportunity starts on the primary channel for a WiFi device, the device can additionally also transmit on that non-primary channel. This mechanism is known as channel bonding (and was further enhanced with the concept of preamble puncturing).

For any channel (primary or non-primary), a WiFi device has two channel sensing mechanism defined to sense the channel state as IDLE/BUSY:

Preamble detection: A WiFi device determines a 20 MHz channel as being BUSY if it can successfully detect a WiFi preamble on that channel with a received power higher than −82 dBm.

Energy detection: A WiFi device determines a 20 MHz channel as being BUSY if it senses any power on that channel with a received power higher than −62 dBm.

If neither of the above two conditions are satisfied, the channel is sensed as IDLE by the WiFi device.

Various embodiments of the present disclosure recognize that to meet the ever-growing demand for data, the density of Wi-Fi networks is growing, causing BSSs that have an overlap in their respective operating channels to become closer to each other. Such BSSs, are referred to as Overlapping BSS (OBSS), can interfere with each other causing several issues that impact end user experience:

If OBSS interference is below −62 dBm, it can still create intolerable amount of interference at the edge of a BSS.

If the OBSS interference is above −62 dBm, and it occupies the primary channel of a BSS, it causes all devices in the BSS to sense channel as BUSY, increasing the latency and reducing the throughput of the BSS.

Correspondingly, there was significant amount of attention given to introducing inter-BSS coordination mechanisms, called multi-AP coordination, to reduce the impact of OBSS interference during the previous WiFi generation 802.11be. More recently, the IEEE 802.11bn task group, also called Ultra-High Reliability (UHR), is also working on new proposals for improving wireless local area network reliability, including the scenarios of OBSS. Several different candidate technologies were discussed for such inter BSS coordination, including:

Coordinated Spatial Reuse: In this mechanism a first AP that wins channel access can coordinate with a second AP on the transmissions powers to use by each of them so that both APs can simultaneously utilize the channel without causing significant interference to one another's BSS.

Coordinated OFDM: In this mechanism a first AP that wins channel access can grant part of its frequency resources to a second AP for use by the second APs BSS for the duration of the first APs channel access.

Coordinated beamforming: In this mechanism, a first AP that wins channel access can coordinate with a second AP on the transmit beamforming to use by each of them so that both APs can simultaneously utilize the channel without causing significant interference to one another's BSS. This mechanism of coordination typically requires the channels between the AP and the devices of the other BSS (that it causes interference to) to be known.

Joint Transmission/Reception: In this mechanism, two or more APs can coordinate to jointly transmit the data to a non-AP device or receive data from a non-AP device. This mechanism of coordination typically requires the two APs to have near perfect time and frequency synchronization and the data to be transmitted should be available at both the APs. In addition, the channels between a non-AP device and both the APs is required to be known.

In such schemes, multiple APs belonging to OBSSs can coordinate with each other and can manage resources to avoid interference to each other. With the help of such schemes, the performance of devices in next generation Wi-Fi networks is expected to be robust in dense multi-AP environment.

Most multi-AP coordination methods involve one AP winning the channel access, called the sharing AP, and this sharing AP then allowing one or more other APs, called the shared APs, to reuse the channel but in a coordinated way to avoid interference to each other. This coordination can be achieved by the sharing AP transmitting a trigger frame indicating the shared APs to coordinate transmissions.

Restricted TWT (rTWT) operation is a key feature introduced in IEEE 802.11be standards with a view to providing better support for latency sensitive applications. Restricted TWT offers a protected service period for its member STAs by sending Quiet elements to other STAs in the BSS which are not member of the rTWT schedule, where the Quiet interval corresponding to the Quiet element overlaps with the initial portion of the restricted TWT SP. Hence, it gives more channel access opportunity for the rTWT member scheduled STAs, which may help latency-sensitive traffic flow.

Various embodiments of the present disclosure recognize that the existing mechanism for multi-AP coordination hinges on the ability of the shared APs to be aware of the sharing AP's winning of channel access, by listening to the trigger frame sent by it. However, if there is already an ongoing transmission in the shared APs BSS, the trigger frame sent by the sharing AP may be missed by the shared AP. In addition, interference at the shared AP caused by another BSS can also cause a failure in successful reception of the trigger frame sent by the sharing AP. These effects significantly reduce the likelihood of successful multi-AP coordination, thus throttling the benefits that multi-AP coordination promises.

Accordingly, various embodiments of the present disclosure provide mechanisms for two or more APs to perform successful multi-AP coordination with a high likelihood by minimizing the likelihood of missing the coordination message sent by a sharing AP.

Figure 3:
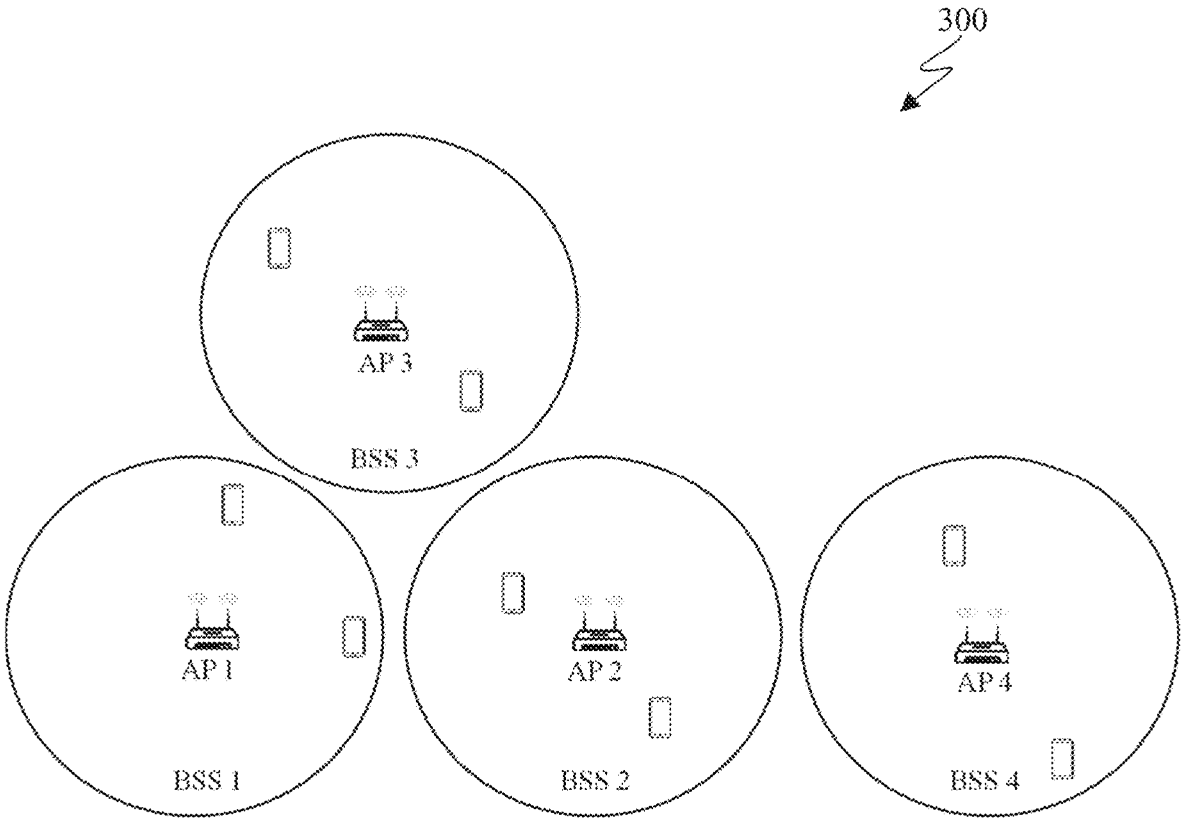
FIG. 3 illustrates an example of a BSS layout for multi-AP coordination according to various embodiments of the present disclosure.

FIG. 3 illustrates an example of a BSS layout for multi-AP coordination 300 according to various embodiments of the present disclosure. The embodiment of the example of a BSS layout for multi-AP coordination 300 shown in FIG. 3 is for illustration only. Other embodiments of the example of a BSS layout for multi-AP coordination 300 could be used without departing from the scope of this disclosure.

As illustrated in FIG. 3, four BSSs are arranged as shown. As a non-limiting example, it may be assumed that AP1 of BSS 1 intends to coordinate with AP2 of BSS2 and AP3 of BSS 3, while BSS4 is an uncoordinated BSS which acts as an interferer. In other words, AP1, AP2 and AP3 are a coordinating set of APs that intend to perform multi-AP coordination.

If AP1 wins channel access and transmits a frame to AP2 to perform multi-AP coordination, there are several cases in which the frame reception can fail at AP2:

- If the OBSS energy from BSS2 to AP1 is between [−82, −62] dBm, then there can be an ongoing transmission in BSS 2 when AP1 wins channel access. This will cause a failure of reception of the frame sent by AP 1.
- If the OBSS energy from BSS2 to AP1 is above −62 dBm, but the primary channel of the two APs is different, then when AP1 wins channel access, the primary channel of AP2 can be occupied by BSS2, preventing inter-AP communication.
- If no device in OBSS2 is transmitting, even then a packet from AP1 can be missed if the interference from BSS 4 at AP2 reduces the packet SNR to below 0 dB.

Figure 4A:
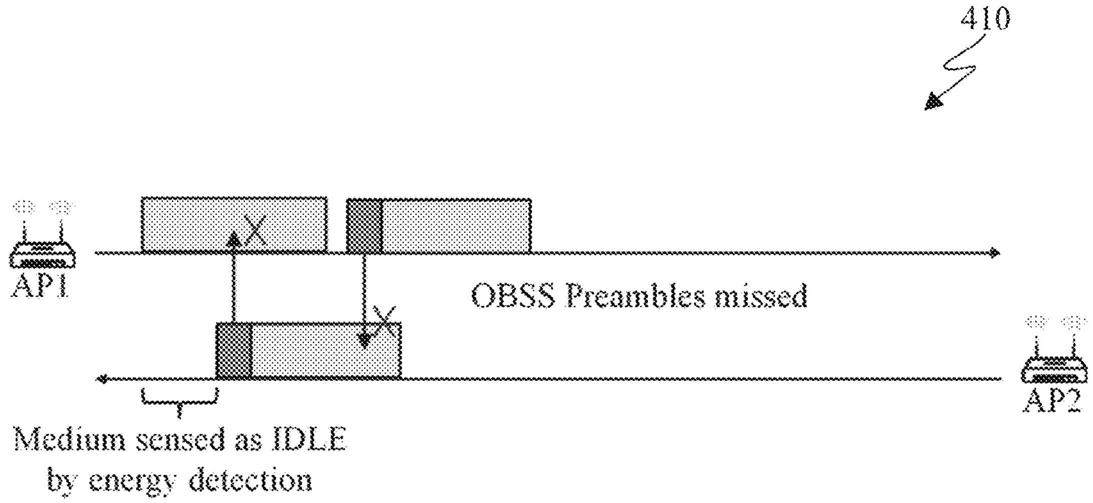
FIGS. 4A-4C illustrate example scenarios where a reception at AP2 for a transmission from AP1 can be missed according to various embodiments of the present disclosure.
Figure 4B:
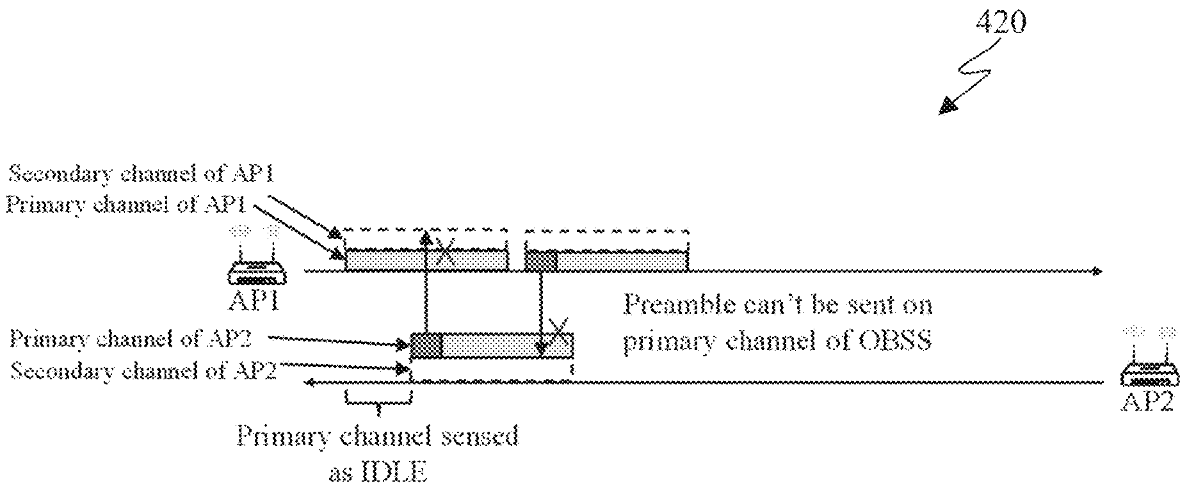
Figure 4C:
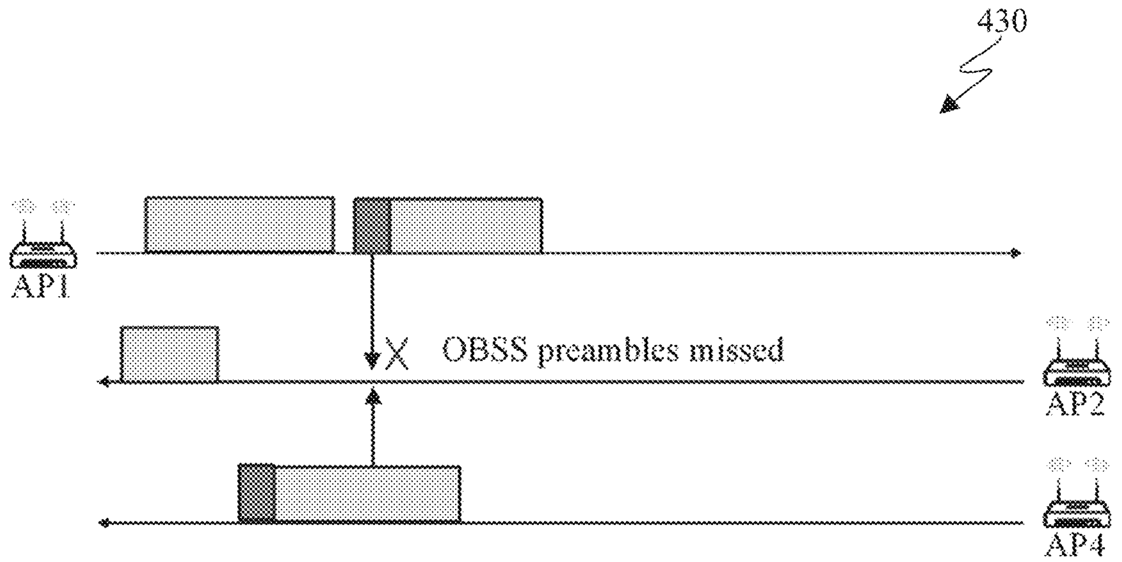

These cases are represented pictorially in FIGS. 4A-4C, which illustrate example scenarios 410, 420, and 430, where a reception at AP2 for a transmission from AP1 can be missed according to various embodiments of the present disclosure. The embodiment of the example scenarios 410, 420, and 430, where a reception at AP2 for a transmission from AP1 can be missed shown in FIGS. 4A-4C are for illustration only. Other embodiments of the example scenarios 410, 420, and 430, where a reception at AP2 for a transmission from AP1 can be missed could be used without departing from the scope of this disclosure.

Correspondingly, some mechanism may be needed to ensure that AP2 can reliably receive a trigger frame sent by AP1 so that multi-AP coordination is successful with good reliability. Note that once AP2 receives the trigger frame successfully, any coordination mechanism like coordinated orthogonal frequency division multiplexing (OFDM), coordinated spatial reuse, coordinated beamforming, joint transmission etc., can be used by AP1 and AP2 for the remainder of the transmission opportunity (TXOP).

Figures 5A, 5B:
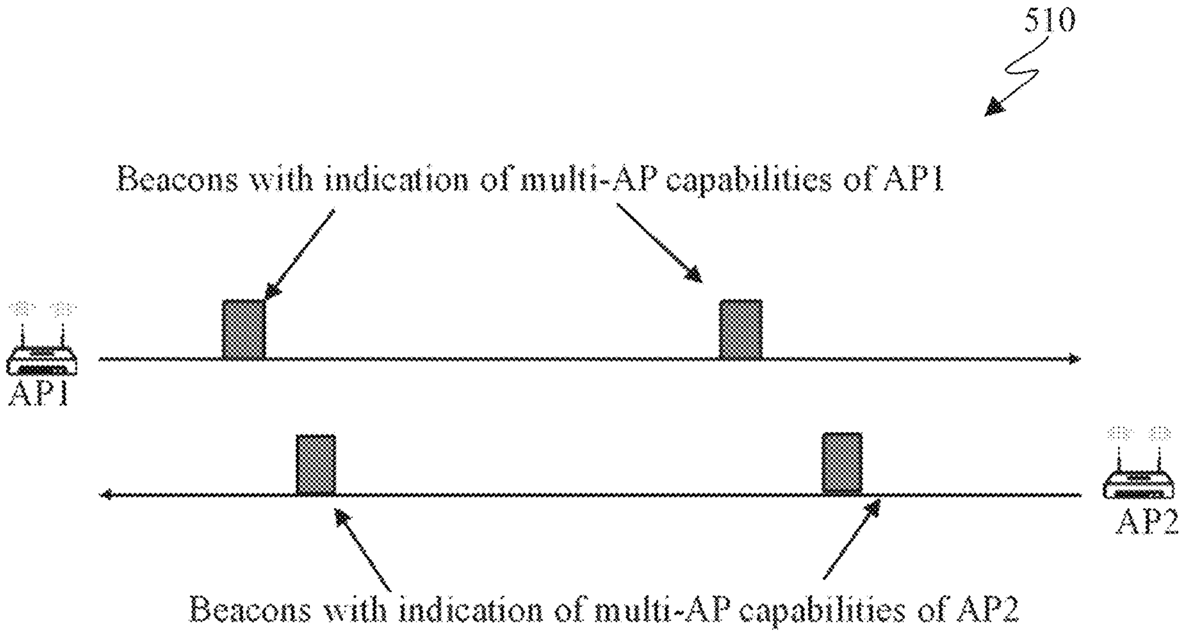
FIGS. 5A-5B illustrate an example of multi-AP coordination capability indication in ultra-high reliability (UHR) capabilities and operations elements of beacon frames according to various embodiments of the present disclosure.

FIGS. 5A-5B illustrate examples 510, 520 of multi-AP coordination capability indication in ultra-high reliability (UHR) capabilities and operations elements of beacon frames 510, 520 according to various embodiments of the present disclosure. The embodiment of the examples 510, 520 of multi-AP coordination capability indication in ultra-high reliability (UHR) capabilities and operations elements of beacon frames shown in FIGS. 5A-5B are for illustration only. Other embodiments of the examples 510, 520 of multi-AP coordination capability indication in ultra-high reliability (UHR) capabilities and operations elements of beacon frames could be used without departing from the scope of this disclosure.

In one embodiment, AP1 may not perform multi-AP coordination with AP2 if the received power at AP1 from AP2 or vice versa is below a certain threshold, e.g., −62 dBm or −82 dBm. In one embodiment, AP1 may not perform multi-AP coordination with AP2 if the primary 20 MHz channels of AP1 and AP2 are not the same. In another embodiment, multi-AP coordination may not be performed if any of the above two conditions are satisfied. In yet another embodiment AP1 and AP2 may not perform multi-AP coordination if the primary channel of one of the APs is outside the operating bandwidth of the other AP. In one embodiment, the above conditions may only apply for coordination over-the-air, and not when there is a dedicated backhaul link between the APs.

In one embodiment an AP may indicate in its UHR Capabilities and Operations element that it includes in beacon frames, its capability to perform multi-AP coordination and the corresponding requirements, for e.g., primary channel overlap requirement, minimum received power constraint etc. Correspondingly two APs may perform multi-AP coordination if their respective capabilities can support the actual constraints present between them.

If two coordinating APs do not have the same primary channel, then all frames transmitted between them, including the trigger frame or a request to send (RTS) sent by the sharing AP that is used to initiate the coordination, the clear-to-send (CTS) sent by the shared AP, acknowledgement (ACK) frames between them, etc., may be sent in duplicate non-HT PPDU format.

In one embodiment, the trigger frame or the request frame sent by an AP to another coordinating AP, its response frame, etc., may all be transmitted at a basic rate and a mandatory PHY rate. In one embodiment, the destination address may be set as a broadcast address or as a group MAC address that uniquely identifies a coordinating set of APs.

Figure 6A:
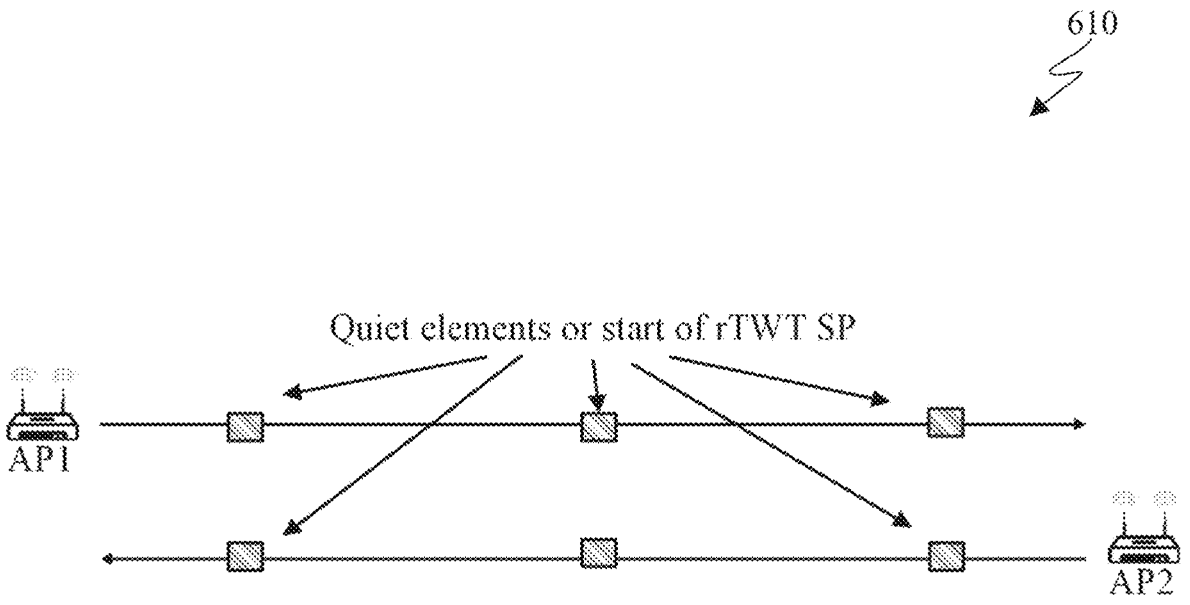
FIGS. 6A-6B illustrate examples for periodically synchronizing the BSSs according to various embodiments of the present disclosure.
Figure 6B:
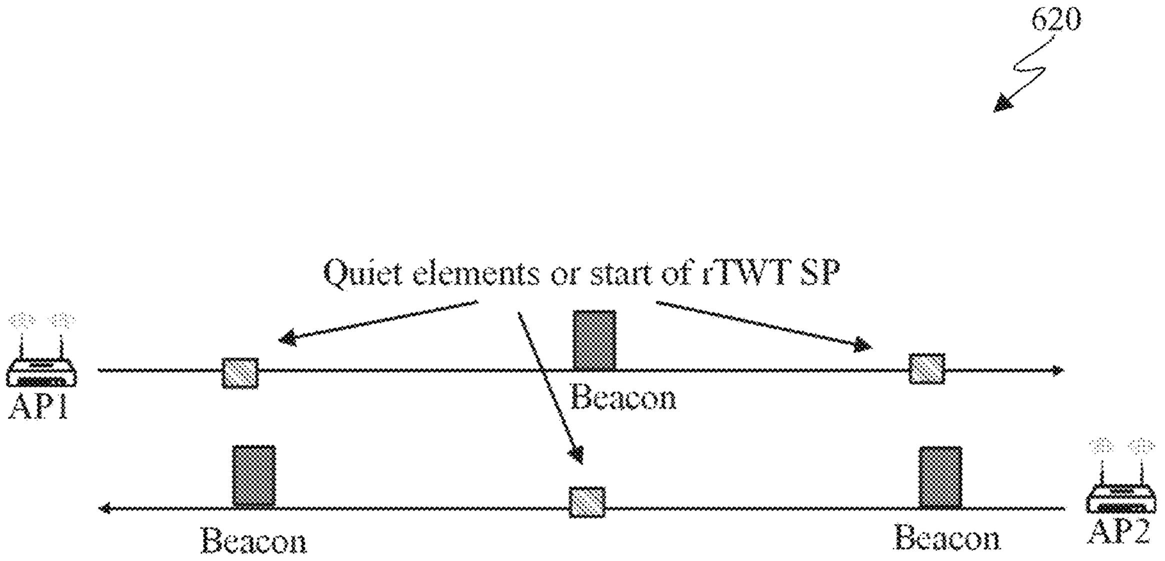

FIGS. 6A-6B illustrate examples 610, 620 for periodically synchronizing the BSSs according to various embodiments of the present disclosure. The embodiment of the examples 610, 620 for periodically synchronizing the BSSs shown in FIGS. 6A-6B are for illustration only. Other embodiments of the examples 610, 620 for periodically synchronizing the BSSs could be used without departing from the scope of this disclosure.

In another case, the coordinating APs: AP1 and AP2 may follow some periodic mechanism to ensure that transmissions in their respective BSS are synchronized with a high probability.

In one embodiment where the primary 20 MHz channel of the two APs is different, they may periodically ensure that transmissions are performed with channel bonding in their respective BSS, where the transmission spans both the APs primary bandwidths.

In another embodiment, each of the coordinating APs may schedule a periodic quiet element in their respective BSS such that the quiet elements are aligned in time with each other. In another variant of this embodiment, each of the coordinating APs may schedule a periodic quiet element in their respective BSS such that the quiet elements are aligned in time with the target beacon transmit time (TBTT) of the other AP. This can be to help ensure that the transmissions of the two BSS become synchronized, and they can also decode each other's beacons.

In another embodiment, each of the coordinating APs may schedule a restricted TWT (rTWT) service period (SP) in their respective BSS such that the rTWT SPs are aligned in time with each other. In a variant of this embodiment, each of the coordinating APs may schedule a rTWT SP in their respective BSS such that the quiet elements are aligned in time with the TBTT of the other AP. This can be to help ensure that the transmissions of the two BSS become synchronized, and they can also decode each other's beacons. In this embodiment, each of the APs may indicate the rTWT schedule as full in the corresponding TWT element transmitted in the beacon frame.

In another embodiment, each of the coordinating APs may be aware of each other's TBTT and they may ensure that they end their on-going frame exchange (if they are the owner of a TXOP) at the TBTT of the other coordinating AP. In another variant, if an AP is a CTS responder for a TXOP, it may not respond with a CTS to an RTS transmitted by a STA in its BSS if the NAV time of the RTS overlaps with the TBTT of the coordinating AP.

Figure 7:
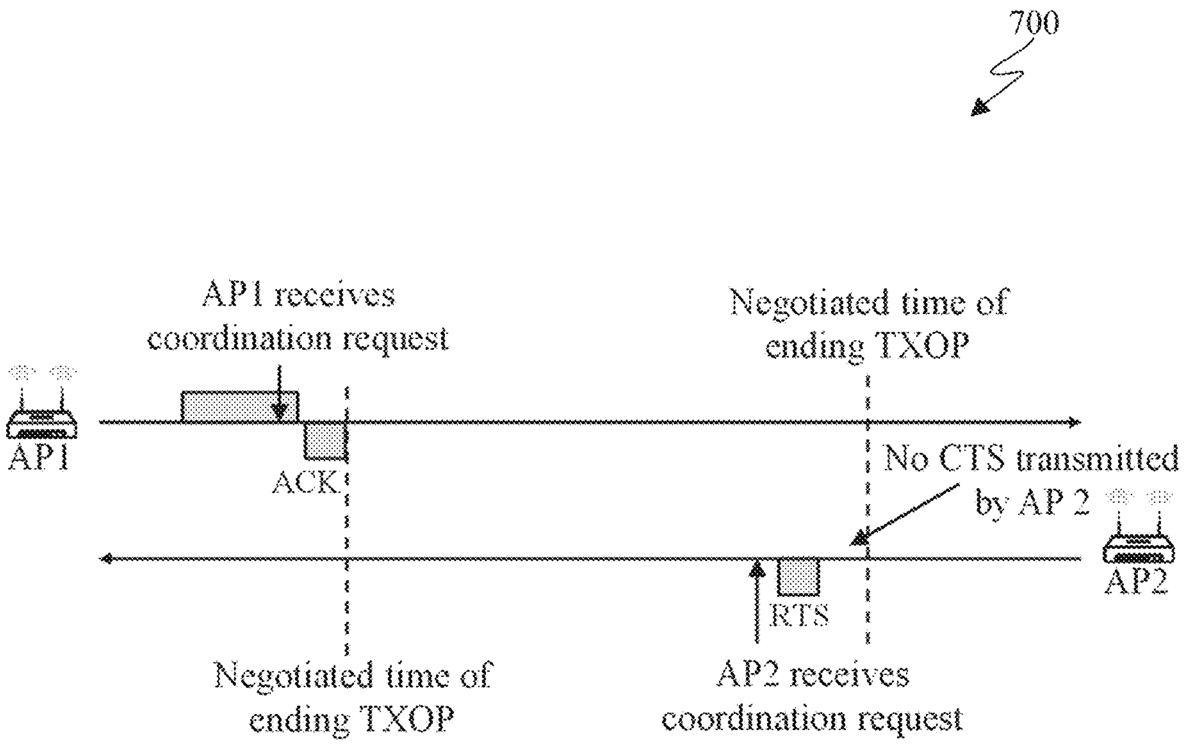
FIG. 7 illustrates an example of performing synchronization upon receipt of a request according to various embodiments of the present disclosure.

FIG. 7 illustrates an example 700 of performing synchronization upon receipt of a request according to various embodiments of the present disclosure. The embodiment of the example 700 of performing synchronization upon receipt of a request shown in FIG. 7 is for illustration only. Other embodiments of the example 700 of performing synchronization upon receipt of a request could be used without departing from the scope of this disclosure.

In one embodiment, upon receiving a coordination request message from a coordinating AP to synchronize the transmissions, an AP may ensure that it ends any on-going frame exchange (if it is the owner of a TXOP) at a specific time. If the AP is a CTS responder for a TXOP, it may not respond with a CTS to an RTS transmitted by a STA in its BSS if the NAV time of the RTS overlaps with a specific time. The specific time can be, for example, immediately upon receiving the request message, or a predetermined time, such as a SIFS time+ACK time, or a specific time that is negotiated within the coordination request message and/or its response message. In this case, a mechanism can be introduced to prevent other STAs of the BSS from winning the channel access before the other requesting AP initiates the multi-AP coordination trigger frame. This can be achieved, for example, by the first AP setting the NAV timer to be slightly longer than the requested coordination time. The additional time can be, in one example, 1 TU.

In one embodiment, the coordination request message can be sent over the ethernet or over any wired or wireless backhaul link between the two coordinating APs. In yet another embodiment, as discussed herein, the coordination request message can be sent on the wireless medium during "hooks" or "gaps" provided in transmission by each of the coordinating APs for sharing such inter-AP coordination request messages.

In one example, the coordination request message may be called a synchronization request message.

Figure 8:
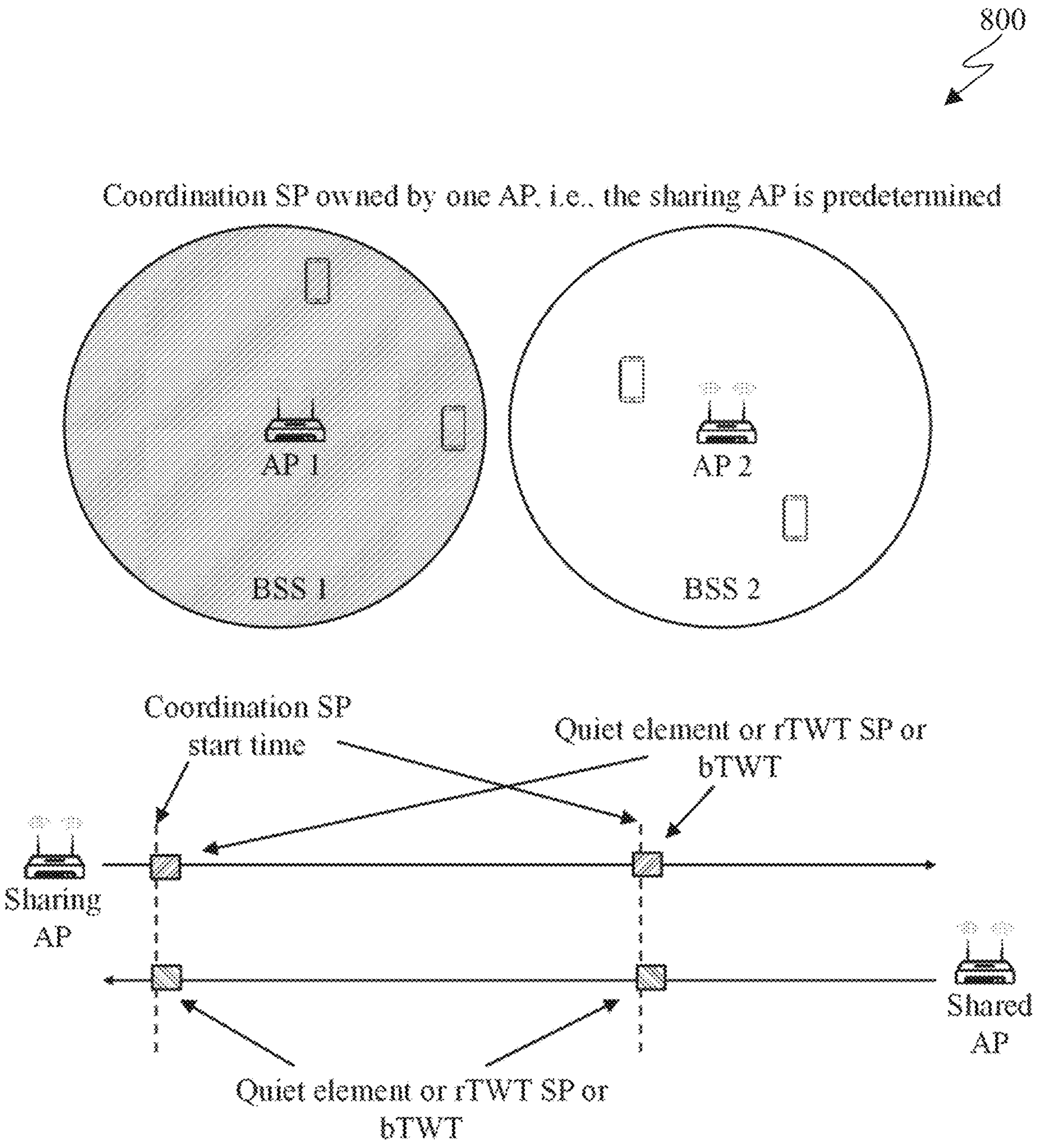
FIG. 8 illustrates an example of protecting a start time of a coordination service period (SP) according to various embodiments of the present disclosure.

FIG. 8 illustrates an example 800 of protecting a start time of a coordination service period (SP) according to various embodiments of the present disclosure. The embodiment of the example 800 of protecting a start time of a coordination SP shown in FIG. 8 is for illustration only. Other embodiments of the example 800 of protecting a start time of a coordination SP could be used without departing from the scope of this disclosure.

In one embodiment, there may be periodic dedicated intervals for multi-AP coordination called coordination service periods. (SPs). These SPs may have a specified with the start time of each period, the inter-SP interval and the persistence (which indicates how long the schedule lasts). These parameters can be negotiated between the APs at some regular intervals, and the persistence indicates when the next negotiation takes place.

In one embodiment, the coordination SP can be dedicated to one AP (or its BSS). For example, in the case illustrated in FIG. 3, each of AP1, AP2 and AP3 may have their dedicated coordination SPs. During its own coordination SP, an AP may become the sharing AP, i.e., the TXOP owner while and the other APs among the set {AP1, AP2, AP3} may perform multi-AP coordination as a shared APs.

In one embodiment, the sharing AP may schedule a quiet interval or an rTWT SP that aligns with the start time of this coordination SP. This can be to end transmissions in its own BSS so that the sharing AP can initiate multi-AP coordination. In one embodiment, the sharing AP may indicate this SP as "full", i.e., a non-AP STA may not request to join the SP. In another embodiment, this rTWT SP can be a new type of rTWT or broadcast TWT (bTWT), which is identified as being defined for multi-AP coordination. Correspondingly the bTWT element for this SP that is included in beacon frames may also include an identifier of all the 'potential' shared APs, who will coordinate within the SP. The identifier can be, for example, the shared APs' MAC addresses, their transmitting BSSIDs etc. In one variant, the indication of the potential shared APs may be included in a separate element transmitted by the AP called the Coordinating AP element, which can have a list that has an entry corresponding to each such bTWT element, identified by the bTWT identifier (ID). In this embodiment, a non-AP STA associated with a sharing AP may be allowed to send a request to join the SP. In another variant, the bTWT can have a specific ID that indicates that all associated STAs are automatically member STAs. In one embodiment, the sharing AP can start transmission in the coordination SP immediately at the start time of the SP after winning the channel access, i.e., no deferral. In one embodiment, the STAs associated with the sharing AP that are members of the coordination SP may not initiate a transmission in the coordination SP until the sharing AP starts transmission or until a deferral time. This deferral time can be, for example, 1 transmit unit (TU) or can be shorter.

The shared APs may schedule a quiet interval or an rTWT SP that aligns with the start time of the coordination SP, to ensure end of transmissions in their own BSS. In one embodiment, a shared AP may indicate this SP as "full", i.e., a non-AP STA may not request to join the SP. In another embodiment, this rTWT SP can be a new type of rTWT or broadcast TWT, which is identified as being defined for multi-AP coordination. Correspondingly the bTWT element for this SP that is included in beacon frames may also include an identifier of the sharing AP, who is the owner of the SP. The identifier can be, for example the sharing APs MAC address, its transmitting BSSID etc. In one variant, the indication of the sharing APs may be included in a separate element transmitted by the AP called the Coordinating AP element, which can have a list that has an entry corresponding to each such bTWT element, identified by the bTWT identifier (ID). In this embodiment, a non-AP STA associated with a shared AP may be allowed to send a request to join the SP. In one embodiment, the shared AP or the STAs associated with the shared AP that are members of the coordination SP may not initiate a transmission in the coordination SP until the sharing AP starts transmission or until a deferral time. This deferral time can be, for example, 1 TU or can be shorter.

Figure 9:
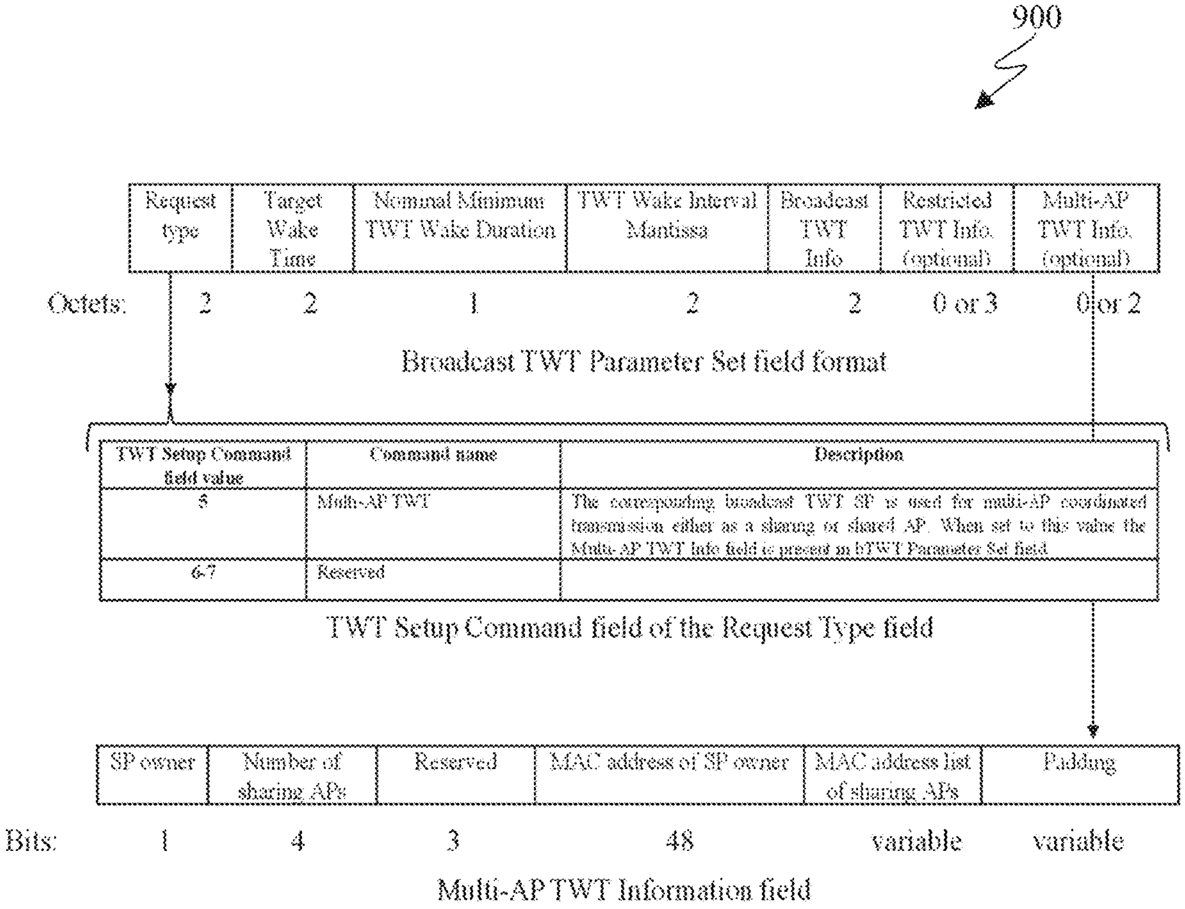
FIG. 9 illustrates an example of a broadcast target wake time (TWT) element for multi-AP coordination according to various embodiments of the present disclosure.

FIG. 9 illustrates an example 900 of a broadcast TWT element for multi-AP coordination according to various embodiments of the present disclosure. The embodiment of the example 900 of a broadcast TWT element for multi-AP coordination shown in FIG. 9 is for illustration only. Other embodiments of the example 900 of a broadcast TWT element for multi-AP coordination could be used without departing from the scope of this disclosure.

In one embodiment, the bTWT element included in the beacon by an AP, for protecting a coordinating SP may have an identifier to indicate if the AP is the sharing AP for that coordination SP or if it's a shared AP, along with the information mentioned above, e.g., the list of the coordinating AP's identifiers etc. In one example this new variant of bTWT can be called a multi-AP TWT and an example format of this element can be as illustrated in FIG. 9. In one variant of this embodiment, the "MAC address link of sharing APs" field may be present only if the transmitting AP is the owner, i.e., the "SP owner" bit is set to 1. In one variant the "MAC address of the SP owner" field may be present only if the transmitting AP is not the owner, i.e., the "SP owner" it is set to 1. In a variant the "BSSID of SP owner" may be used instead of the MAC address.

In one variant of this embodiment, only the shared APs may end their transmissions at the beginning of a coordination SP, while STAs associated with those APs may not be expected to follow this rule. Correspondingly in this embodiment, a shared AP may not include an explicit bTWT element in its beacons to ensure such protection from the STAs of its BSS. The sharing AP, however, may still include a bTWT element to enable interested STAs to join the coordination SP.

Figure 10:
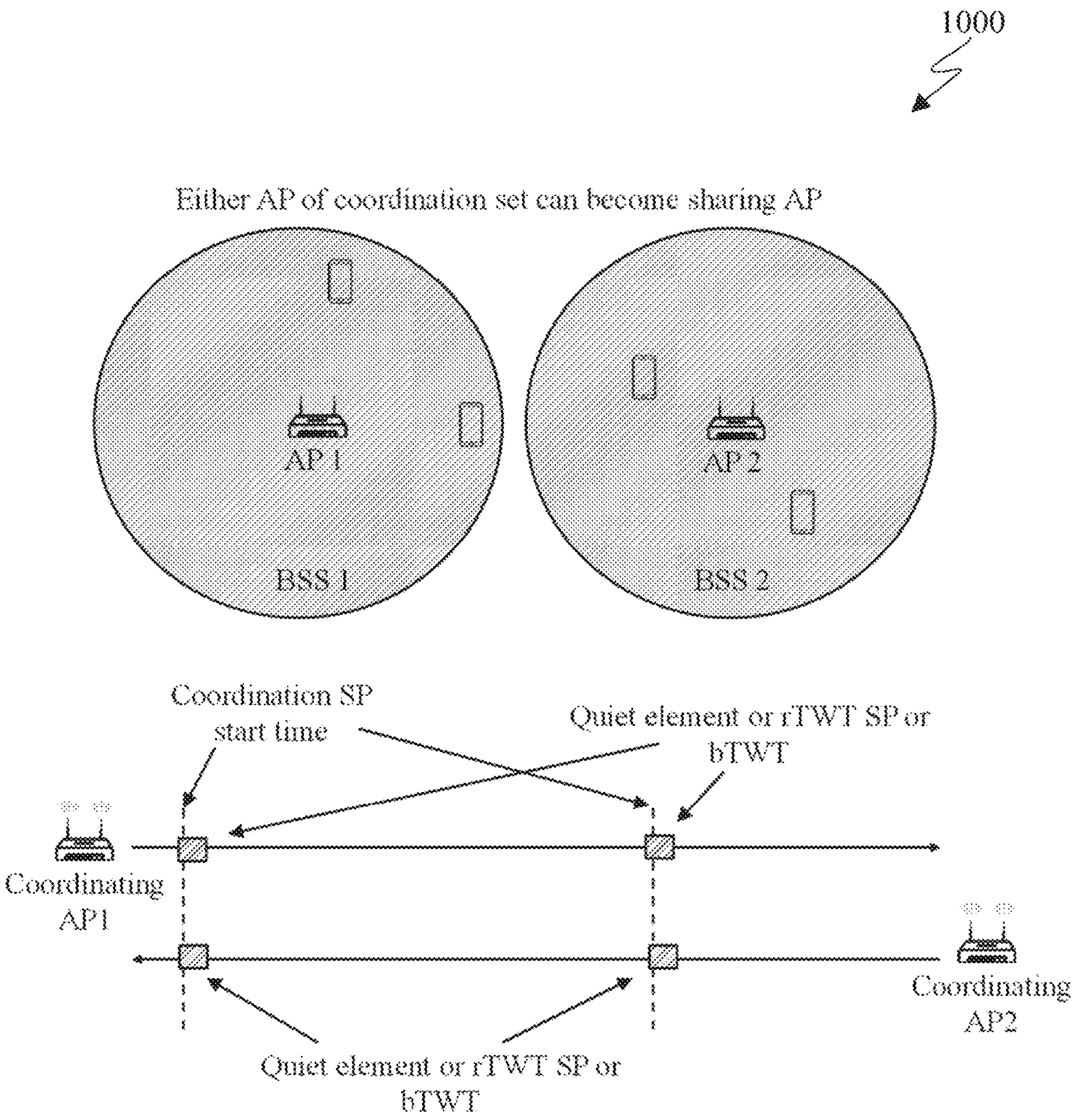
FIG. 10 illustrates an example of protecting a start time of a coordination SP according to various embodiments of the present disclosure.

FIG. 10 illustrates an example 1000 of protecting a start time of a coordination SP according to various embodiments of the present disclosure. The embodiment of the example 1000 of protecting a start time of a coordination SP shown in FIG. 10 is for illustration only. Other embodiments of the example 1000 of protecting a start time of a coordination SP could be used without departing from the scope of this disclosure.

In one embodiment, there may be periodic dedicated intervals for multi-AP coordination called coordination service periods. (SPs). These SPs may have a specified with the start time of each period, the inter-SP interval and the persistence (which indicates how long the schedule lasts). These parameters can be negotiated between the APs at some regular intervals, and the persistence indicates when the next negotiation takes place.

In one embodiment, the coordination SP can be dedicated to a cluster of coordinating APs. For example, in case of FIG. 3, a single coordination SP may be defined jointly for AP1, AP2 and AP3. During its own coordination SP, any of the 3 APs may become the sharing AP, i.e., the TXOP owner, while and the other APs among the set {AP1, AP2, AP3} may perform multi-AP coordination as a shared APs. The determination of who becomes the sharing AP can be based on random contention, or it can be in a round-robin fashion across the different SPs. In yet another embodiment, there can be a dedicated master AP for the cluster who always becomes the sharing AP for the coordination SP and may then assign resources and/or control to the other APs. Note that this case of having a master AP operation may be similar to embodiment 4.

In one embodiment, each of the coordinating APs may schedule a quiet interval or an rTWT SP that aligns with the start time of this coordination SP. This can be to end transmissions in its own BSS so that the sharing AP can initiate multi-AP coordination. In one embodiment, the AP may indicate this SP as "full", i.e., a non-AP STA may not request to join the SP. In another embodiment, this rTWT SP can be a new type of rTWT or broadcast TWT, which is identified as being defined for multi-AP coordination. Correspondingly, the bTWT element for this SP that is included in beacon frames may also include an identifier of all the 'potential' coordinating APs, who will coordinate within the SP. The identifier can be, for example, the APs' MAC addresses, their transmitting BSSIDs etc. In this embodiment, a non-AP STA associated with the AP may be allowed to send a request to join the SP. In another variant, the bTWT can have a specific ID that indicates that all associated STAs are automatically member STAs. In one variant, the indication of the coordinating APs may be included in a separate element transmitted by the AP called the Coordinating AP element, which can be a list that has an entry corresponding to each such bTWT element, identified by the bTWT identifier (ID). In one embodiment, the AP can start transmission in the coordination SP immediately at the start time of the SP after winning the channel access, i.e., no deferral time. In one embodiment, the STAs associated with the AP that are members of the coordination SP may not initiate a transmission in the coordination SP until the sharing AP starts transmission or until a deferral time. To give preference to the coordinating APs to win the channel access, this deferral time for the non-AP STAs can be, for example, 1 transmit unit (TUs) or can be shorter.

In one variant of this embodiment, only the coordinating APs may end their transmissions at the beginning of a coordination SP, while STAs associated with those APs may not be expected to follow this rule. Correspondingly in this embodiment, the APs may not include an explicit bTWT element in its beacons to ensure such protection from the STAs of its BSS.

Figure 11A:
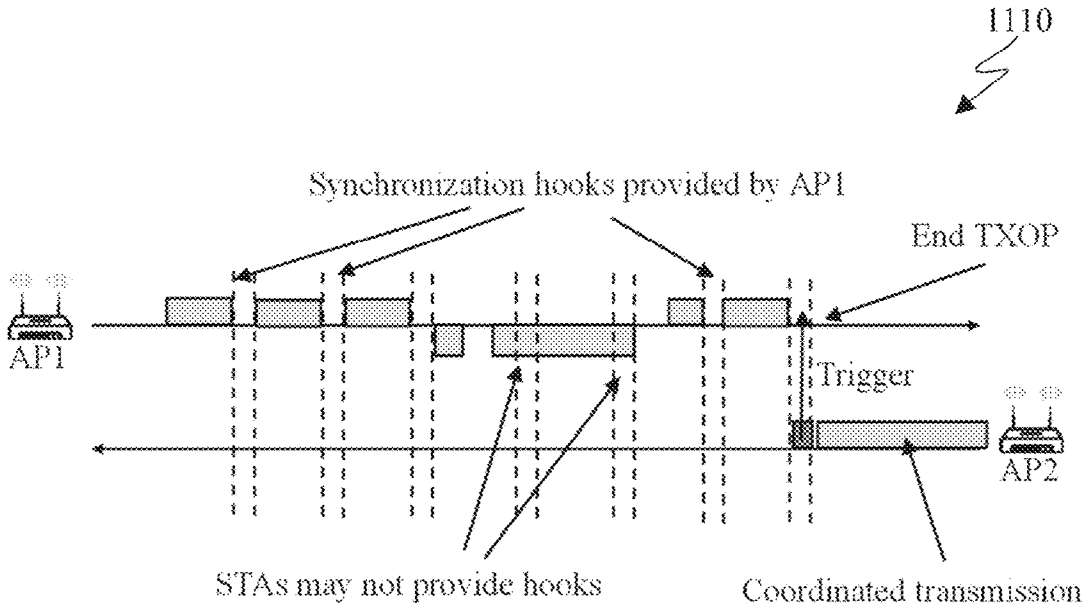
FIGS. 11A-11B illustrate examples of using synchronization hooks to perform inter-AP synchronized transmission according to various embodiments of the present disclosure.
Figure 11B:
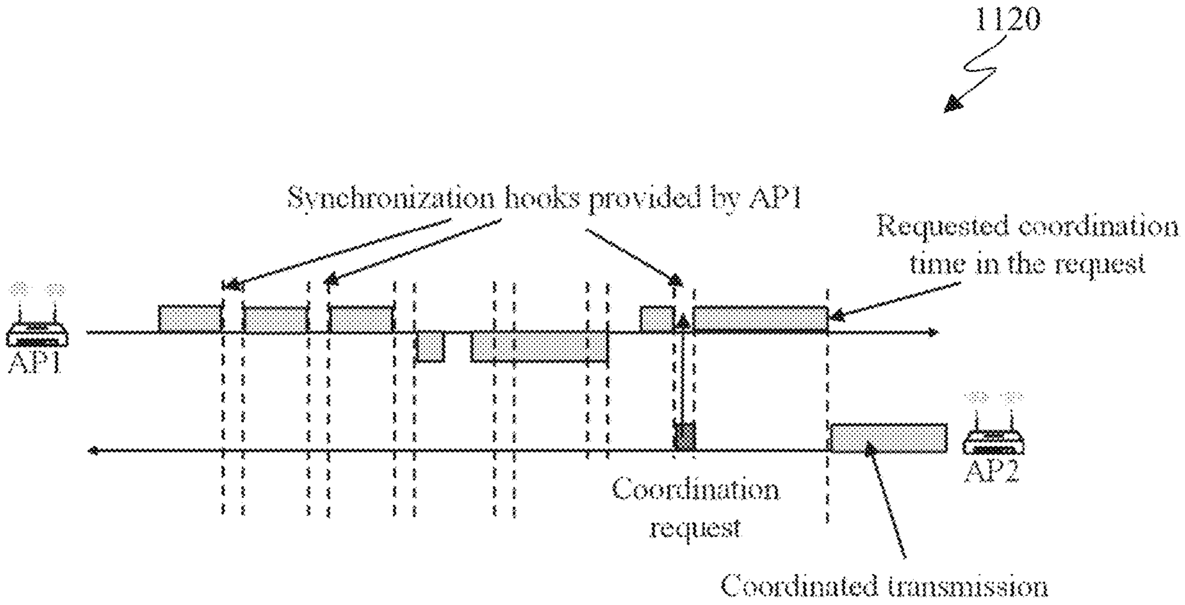

FIGS. 11A-11B illustrate examples 1110, 1120 of using synchronization hooks to perform inter-AP synchronized transmission according to various embodiments of the present disclosure. The embodiment of the examples 1110, 1120 of using synchronization hooks to perform inter-AP synchronized transmission shown in FIGS. 11A-11B are for illustration only. Other embodiments of the examples 1110, 1120 of using synchronization hooks to perform inter-AP synchronized transmission could be used without departing from the scope of this disclosure.

In one embodiment, the coordinating AP1 may include gaps in the transmission of their downlink TXOPs at predetermined periodic durations (if they are the TXOP owner). These gaps can be called, for example a synchronization hook, and can be of a specific duration, called a coordination inter-frame spacing duration (CIFS). The duration can be long enough to ensure that it can be used to decode a neighbor AP2 preambles or receive a request-to-send (RTS) frame or a trigger frame from the neighbor AP2. Each such synchronization hook in the transmission of an AP1 can be assigned to a specific neighbor AP from the coordination set. A neighbor AP that intends to initiate a coordination with the AP1 can use the hooks that are pre-assigned to it for sending a trigger frame or an RTS frame indicating a desire to coordinate with AP1. For example, if an AP2 has some buffered units (BUs) that it intends to deliver using multi-AP coordination with AP1, it waits for the next available synchronization hook at AP1 that is assigned to it and then sends a trigger frame to request taking control of the TXOP. Upon receiving such a trigger from an AP2 within the CIFS duration, AP1 may end its ongoing transmission and may allow AP2 to perform the multi-AP coordination for the TXOP as the sharing AP. If a trigger is not received from an AP2 within the CIFS duration, then AP1 may resume control of its TXOP and continue transmission of frames as scheduled for that TXOP. In one variant, AP1 may reject a sharing of the TXOP via such a synchronization hook.

In another variant of this embodiment, if AP2 has some BU(s) that it intends to deliver using multi-AP coordination, it sends a "Coordination request" message to AP1 on the next available synchronization hook assigned to it, along with an indication of specific time of coordination. In this embodiment, the CIFS duration can be long enough to accommodate the coordination request message and any corresponding acknowledgement. AP1 then resumes its normal scheduled operation after the end of the CIFS duration but ensures that it performs end time alignment of its TXOP with the time indicated in the coordination request message. The indicated time can be, for example, the end time of the TXOP in AP2's BSS. In this case, a mechanism can be introduced to prevent other STAs of BSS1 from winning the channel access before AP2 initiates the multi-AP coordination trigger frame. This can be achieved, for example, by AP1 setting the NAV timer to be slightly longer than the requested coordination time. The additional time can be, in one example, 1 TU.

In one embodiment, the coordination of the start time and period of these "synchronization hooks" that are provided by each AP of the coordination set and the assignment of the hooks to each other AP of the coordination set can be pre-determined during a multi-AP negotiation procedure. Such a negotiation can be performed for example on the backhaul or even over the wireless medium at specific intervals.

Figure 12:
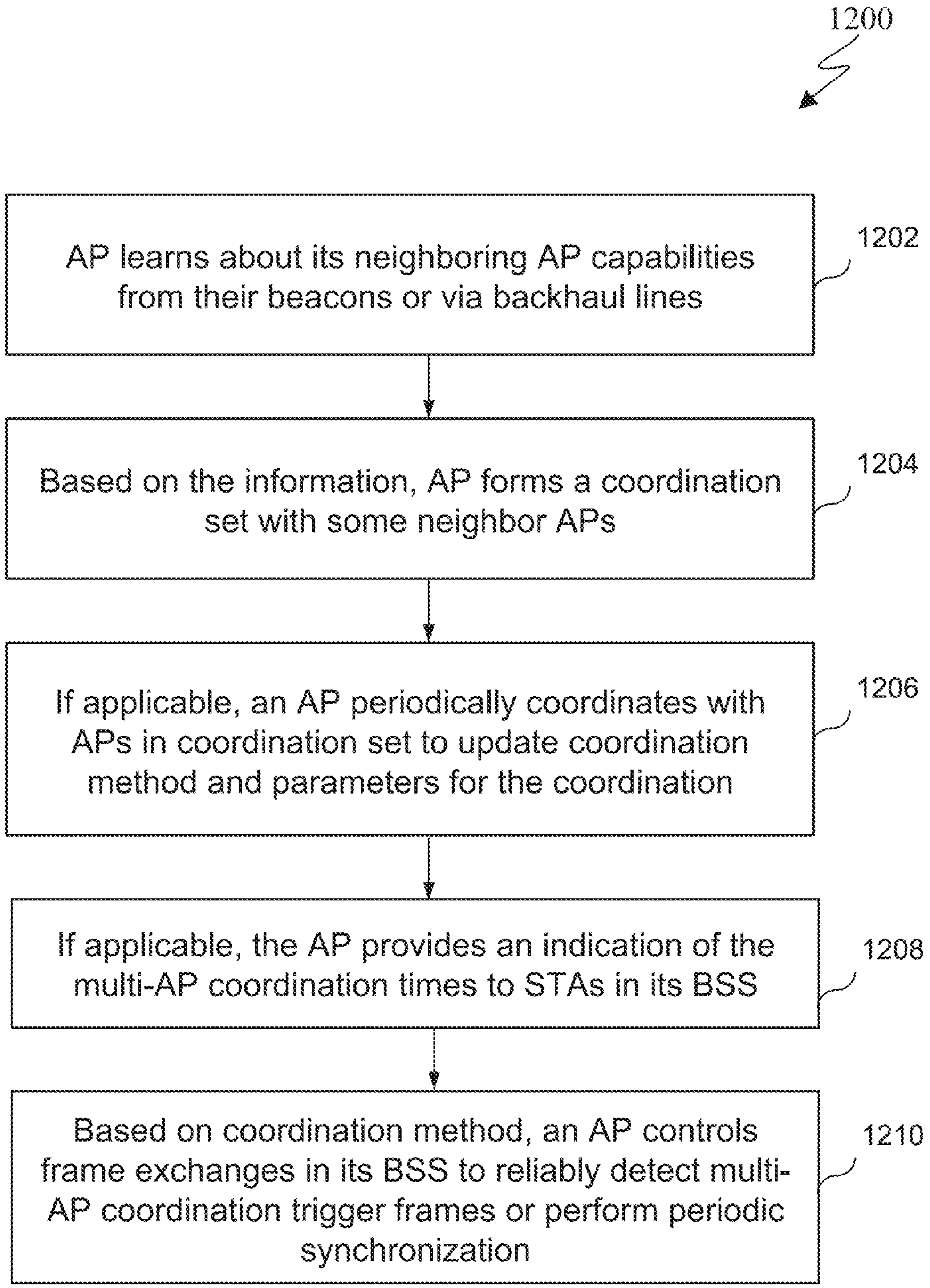
FIG. 12 illustrates a flow diagram of an example of a method performed by an AP for facilitating reliable multi-AP coordination according to various embodiments of the present disclosure.

FIG. 12 illustrates a flow diagram of an example of a method 1200 performed by an AP for facilitating reliable multi-AP coordination according to various embodiments of the present disclosure. The embodiment of the method 1200 performed by an AP for facilitating reliable multi-AP coordination shown in FIG. 12 is for illustration only. Other embodiments of the method 1200 performed by an AP for facilitating reliable multi-AP coordination could be used without departing from the scope of this disclosure.

In one embodiment, it may not be sufficient to ensure that an AP can listen to preambles transmitted by a neighboring AP it intends to coordinate with. Despite a shared AP decoding the preamble of a sharing AP, the coordination can fail. This can happen if a non-AP STA in the BSS of the shared AP, and that is outside the preamble detection threshold of the sharing AP, senses medium as IDLE and starts transmitting within the TXOP. To prevent such a non-AP STA from winning channel access, some protection mechanism may be required.

In one embodiment, a sharing AP may transmit a CTS-to-self message at the beginning of a multi-AP coordination period, to ensure no other STA in its BSS initiates a transmission during a multi-AP coordination period. In another case, a multi-AP coordination may always be initiated with an RTS-CTS mechanism or a trigger-response mechanism where the shared AP transmits the CTS or the response frame and helps the STAs in its BSS to set their NAV and prevent channel access that overlaps with the sharing AP's TXOP. In another embodiment, although a sharing AP may end its transmission at a specific time to start multi-AP coordination, it may set the NAV timer of its TXOP a little longer by, say 1 TU, to ensure no other non-AP devices contend for medium immediately.

As illustrated in FIG. 12, the method 1200 begins at step 1202, where an AP learns about its neighboring AP's capabilities from their beacons or via backhaul links. At step 1204, based on the information learned, the AP forms a coordination set with some neighbor APs. At step 1206, the AP may periodically coordinate with APs in the coordination set to update the coordination method and parameters for the coordination. At step 1208, the AP may provide an indication of the multi-AP coordination times to STAs in its BSS. At step 1210, based on the coordination method, the AP may control frame exchanges in its BSS to reliably detect multi-AP coordination trigger frames or perform periodic synchronization.

Figure 13A:
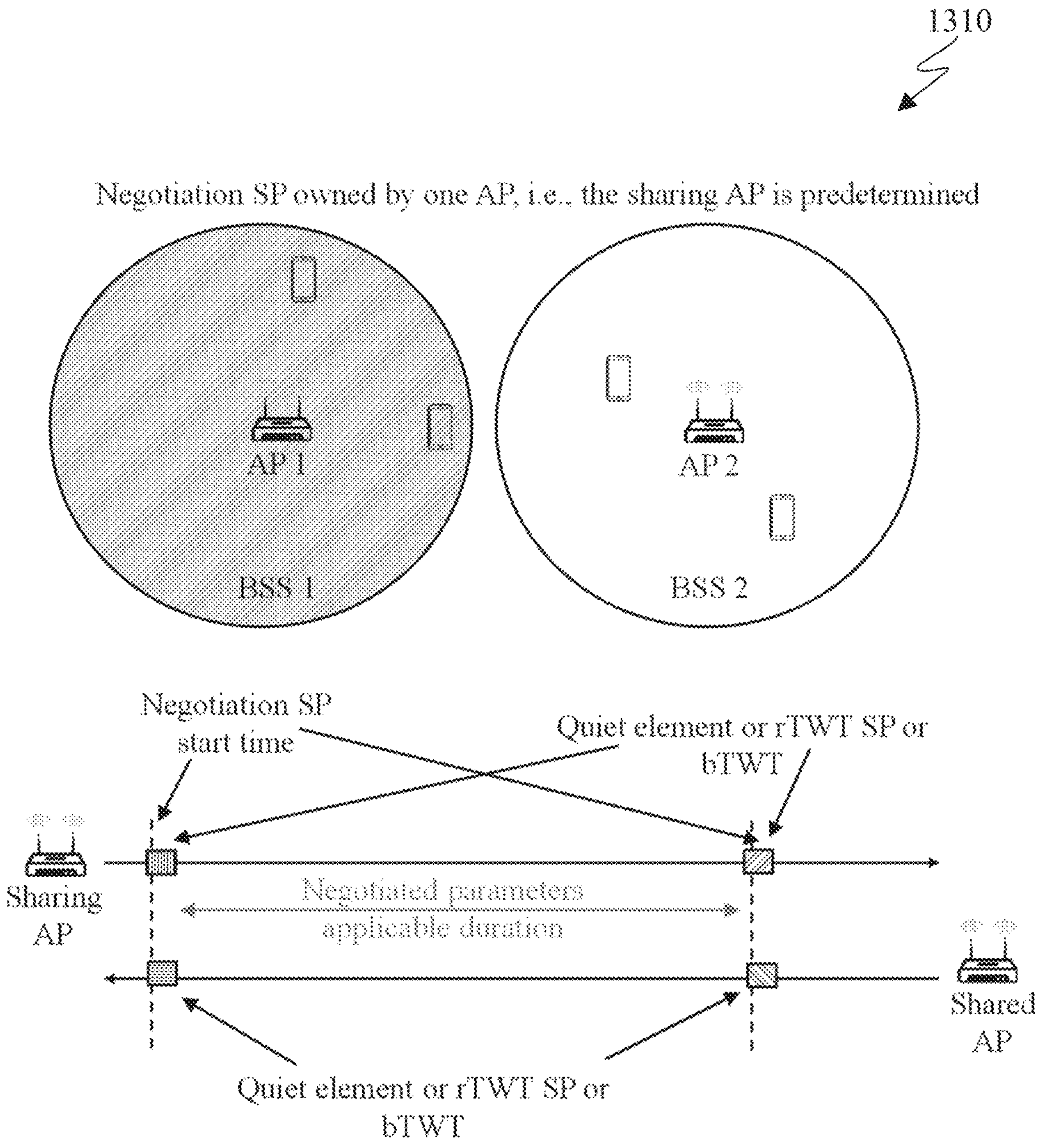
FIGS. 13A-13B illustrate examples of AP-centric and cluster-centric negotiation SPs for coordinating APs to periodically negotiate/update parameters for multi-AP coordination according to various embodiments of the present disclosure.
Figure 13B:
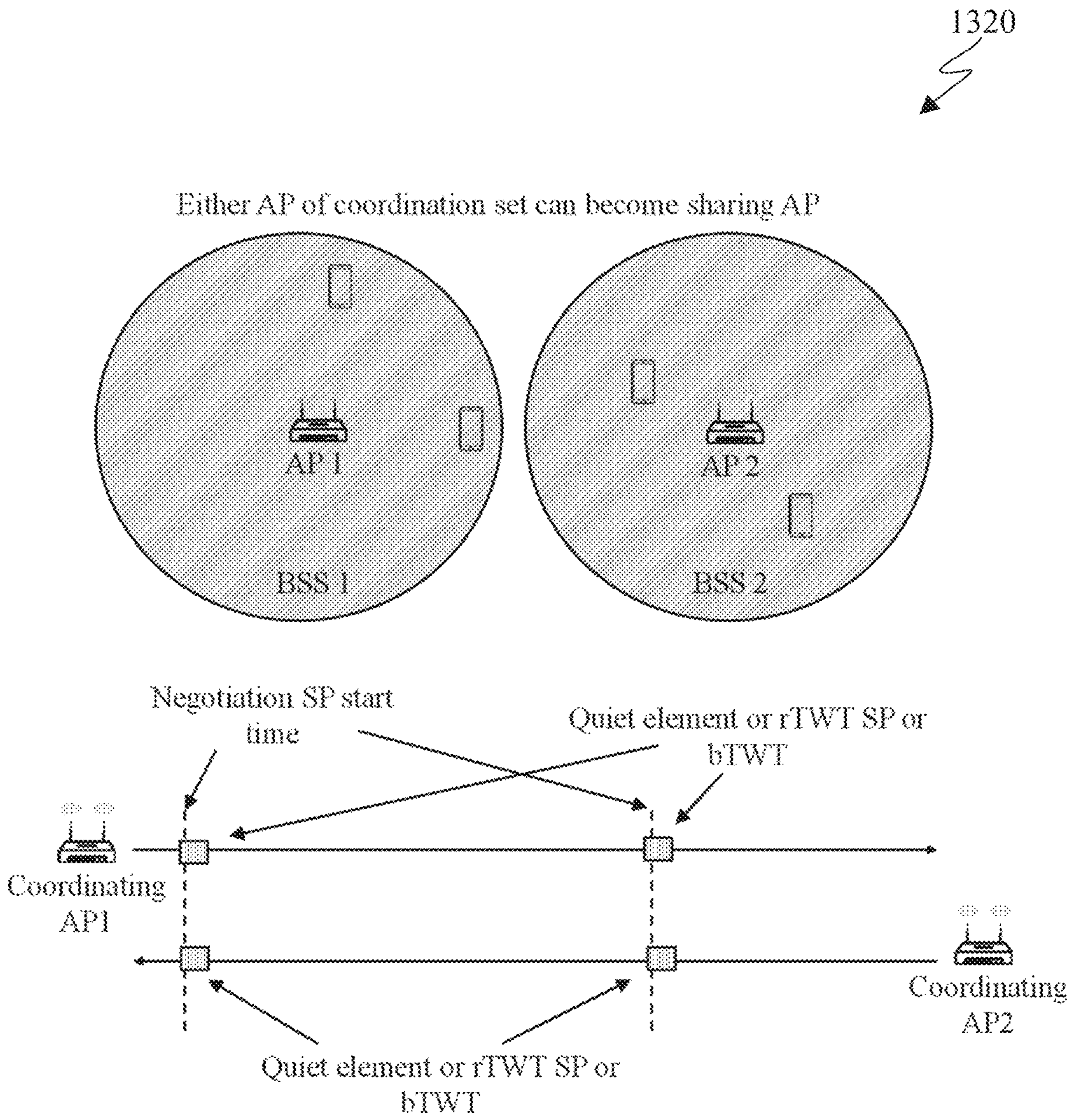

FIGS. 13A-13B illustrate examples 1310, 1320 of AP-centric and cluster-centric negotiation SPs for coordinating APs to periodically negotiate/update parameters for multi-AP coordination according to various embodiments of the present disclosure. The embodiment of the examples 1310, 1320 of AP-centric and cluster-centric negotiation SPs for coordinating APs to periodically negotiate/update parameters for multi-AP coordination shown in FIGS. 13A-13B are for illustration only. Other embodiments of the examples 1310, 1320 of AP-centric and cluster-centric negotiation SPs for coordinating APs to periodically negotiate/update parameters for multi-AP coordination could be used without departing from the scope of this disclosure.

For performing negotiation of the multi-AP coordination parameters to be used between the coordinating APs, in one embodiment a backhaul link or ethernet link can be used. In another embodiment, the wireless medium itself can be used, where there can be a defined periodic interval called a negotiation SP. Two or more APs may negotiate a common periodic "negotiation SP" for inter-AP communication. The SP can be used to determine coordination parameters that will be applicable till the next SP. For example, in one or more embodiments described herein, the start time and periodicity of the coordination SPs and which APs will participate in the coordination can be negotiated or in one or more embodiments described herein, the start time and periodicity of the synchronization hooks and their assignment to the different coordinating APs can be negotiated. In one embodiment, each of the coordinating AP may schedule a quiet interval or an rTWT SP that aligns with the start time of this negotiation SP. This can be to end transmissions in its own BSS so that the coordinating APs can initiate the inter-AP negotiations. In one embodiment, each of the APs may indicate this rTWT SP as "full", i.e., a non-AP STA may not request to join the SP. In one embodiment, this rTWT SP can be a new type of rTWT or broadcast TWT, which is defined for multi-AP coordination. Correspondingly, the bTWT element for this SP that is included in beacon frames may also include an identifier of all the 'potential' coordinating APs, who will coordinate within the SP. The identifier can be, for example, the APs' MAC addresses, their transmitting BSSIDs etc. This information can be used by a neighboring AP that intends to join the coordination set to be available at the start time of the negotiation SP.

In one embodiment, the negotiation SP can be AP centric, i.e., a specific AP is the sharing AP and it initiates the negotiation procedures with all the potential collaborators (shared APs). Correspondingly only the sharing AP may initiate the TXOP within the negotiation SP and the negotiation is between the sharing AP and each of the other APs. For example, in a negotiation SP corresponding to AP1, AP1 negotiates its coordination parameters with AP2 and AP3, but AP2 and AP3 may not negotiate coordination parameters between them. In this case the initiation of the channel access by each of the APs can be as in one or more embodiments described herein.

In another embodiment, the negotiation SP can be cluster centric, where any AP from a coordination cluster of APs can initiate the coordination and the coordination is meant for all the APs or for any pair of APs from the coordination set. In this case, the initiation of channel access by either of the APs in the coordination set can be as in one or more embodiments described herein.

In one variant of this embodiment, only the coordinating APs may end their transmissions at the beginning of the negotiation SP, while STAs associated with those APs may not be expected to follow this rule. Correspondingly in this embodiment, the APs may not include an explicit bTWT element in its beacons to ensure such protection from the STAs of their BSS.

Figure 14:
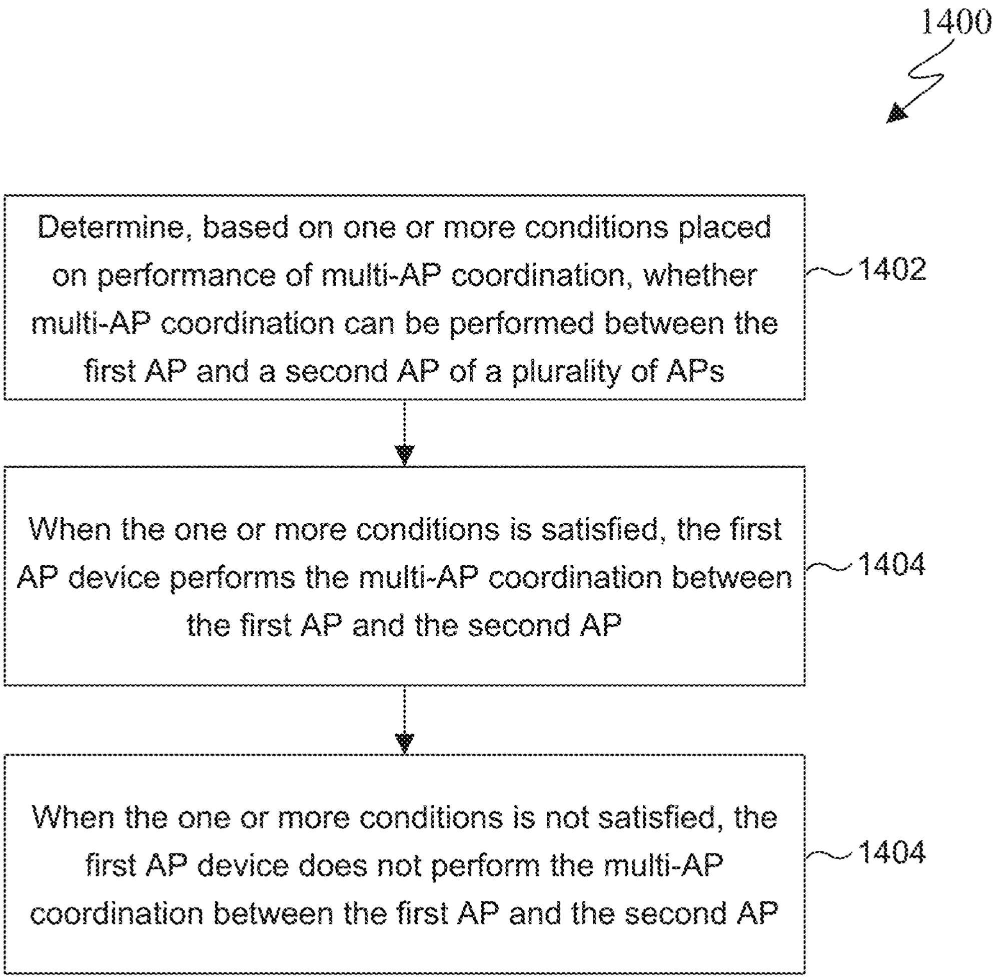
FIG. 14 illustrates a flow diagram of an example of a method for wireless communication performed by an access point device according to embodiments of the present disclosure.

FIG. 14 illustrates a flow diagram of a method 1400 for wireless communication performed by an AP device according to embodiments of the present disclosure. The example method 1400 shown in FIG. 14 is for illustration only. Other embodiments of the example method 1400 could be used without departing from the scope of this disclosure.

As illustrated in FIG. 14, the method 1400 begins at step 1402, where the first AP device determines, based on one or more conditions placed on performance of multi-AP coordination, whether multi-AP coordination can be performed between the first AP and a second AP of a plurality of APs. At step 1404, when the one or more conditions is satisfied, the first AP device performs the multi-AP coordination between the first AP and the second AP. At step 1406, when the one or more conditions is not satisfied, the first AP device does not perform the multi-AP coordination between the first AP and the second AP.

In one embodiment, the one or more conditions comprise: received power at the first AP from the second AP being above a first threshold value; received power at the first AP from the second AP being below a second threshold value; a primary channel of the first AP being the same as a primary channel of the second AP; and the primary channel of the first AP being within an operating bandwidth of the second AP.

In one embodiment, to determine, based on the one or more conditions placed on performance of multi-AP coordination, whether multi-AP coordination can be performed between the first AP and a second AP of a plurality of APs, the first AP device indicates a capability to perform multi-AP coordination to the second AP; and indicates requirements to perform multi-AP coordination to the second AP.

In one embodiment, the one or more conditions comprise perform synchronization of a first basic service set (BSS) associated with the first AP with a second BSS associated with the second AP, where synchronization involves enhancing a probability of successful preamble detection between the first BSS and the second BSS and successful multi-AP coordination between the first BSS and the second BSS.

In one embodiment, the synchronization of the first BSS with the second BSS comprises one or more of: schedule a first periodic quiet element in the first BSS to be aligned in time with a second periodic quiet element in the second BSS; schedule a first restricted target wake time (rTWT) service period (SP) in the first BSS to be aligned in time with a second rTWT SP in the second BSS; the first AP ending its ongoing frame exchange sequences at a start of a second rTWT SP in the second BSS; schedule a periodic quiet element in the first BSS to be aligned in time with a target beacon transmit time (TBTT) in the second BSS; schedule the first rTWT SP in the first BSS to be aligned in time with the TBTT in the second BSS; and the first AP ending its ongoing frame exchange sequences at the TBTT of the second BSS.

In one embodiment, the synchronization of the first BSS with the second BSS is performed at a specific time, as indicated in a request from the second AP to the first AP, the request is sent over an ethernet link, a wired link, or via over-the-air signaling, and the synchronization of the first BSS with the second BSS comprises: the first AP ending its ongoing transmissions at the specific time if the first AP is a transmitter, or the first AP not responding to a control frame initiated by a station in the first BSS if a transmission period by the station is expected to overlap with the specific time.

In one embodiment, multi-AP coordinated transmissions initiated by the second AP with the first AP are performed within a periodic service period (SP) associated with a second basic service set (BSS) associated with the second AP, wherein SP parameters comprise one or more of a start time of each period, an inter-SP interval, a persistence value, indication of the SP's use for multi-AP coordination, an identifier of the second AP as the initiator or an identifier of the first AP as a responder.

In one embodiment, the first AP performs synchronization procedures in a first BSS associated with the first AP at the start time of the periodic SP, the synchronization procedures comprising one or more of: schedule a periodic quiet element in the first BSS to be aligned in time with the start time of the SP in the second BSS; schedule a restricted target wake time (rTWT) service period (SP) in the first BSS to be aligned in time with the SP in the second BSS; schedule a broadcast target wake time (bTWT) service period (SP) in the first BSS to be aligned in time with the SP in the second BSS; and the first AP ending its ongoing frame exchange sequences at the start time of the SP in the second BSS.

In one embodiment, parameters of the rTWT or bTWT SP scheduled by the first AP include one or more of: an indication of the SP's use for multi-AP coordination, the identifier of the second AP as the initiator, the identifier of the first AP as a responder, or an indication of whether non-AP stations are allowed to join the SP as members.

In one embodiment, multi-AP coordinated transmissions initiated by either the first AP or the second AP are performed within a common periodic service period (SP), the first AP scheduling a first SP and the second AP scheduling a second SP aligned with the common periodic service period, wherein parameters of each of the first and second SP comprise one or more of a start time of each period, an inter-SP interval, a persistence value, indication of the SP's use for multi-AP coordination, or identifiers of the first and second APs as participants of the multi-AP coordination.

The above flowcharts illustrate example methods that can be implemented in accordance with the principles of the present disclosure and various changes could be made to the methods illustrated in the flowchart. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method of wireless communication performed by a first access point (AP), the method comprising:

determining, based on one or more conditions placed on performance of multi-AP coordination, whether multi-AP coordination can be performed between the first AP and a second AP of a plurality of APs;

when the one or more conditions is satisfied, performing the multi-AP coordination between the first AP and the second AP; and when the one or more conditions is not satisfied, not performing the multi-AP coordination between the first AP and the second AP, wherein multi-AP coordinated transmissions initiated by either the first AP or the second AP are performed within a common periodic service period (SP), the first AP scheduling a first SP and the second AP scheduling a second SP aligned with the common periodic service period, wherein parameters of each of the first and second SP comprise at least one of a start time of each period, an inter-SP interval, a persistence value, indication of the SP's use for multi-AP coordination, and identifiers of the first and second APs as participants of the multi-AP coordination.

2. The method of claim 1, wherein the one or more conditions comprise:

received power at the first AP from the second AP being above a first threshold value;

received power at the first AP from the second AP being below a second threshold value;

a primary channel of the first AP being the same as a primary channel of the second AP; and the primary channel of the first AP being within an operating bandwidth of the second AP.

3. The method of claim 1, wherein determining, based on the one or more conditions placed on performance of multi-AP coordination, whether multi-AP coordination can be performed between the first AP and the second AP of the plurality of APs comprises:

indicating a capability to perform multi-AP coordination to the second AP; and indicating requirements to perform multi-AP coordination to the second AP.

4. The method of claim 1, wherein the one or more conditions comprise performing synchronization of a first basic service set (BSS) associated with the first AP with a second BSS associated with the second AP, where synchronization involves enhancing a probability of successful preamble detection between the first BSS and the second BSS and successful multi-AP coordination between the first BSS and the second BSS.

5. The method of claim 4, wherein the synchronization of the first BSS with the second BSS comprises at least one of:

scheduling a first periodic quiet element in the first BSS to be aligned in time with a second periodic quiet element in the second BSS;

scheduling a first restricted target wake time (rTWT) SP in the first BSS to be aligned in time with a second rTWT SP in the second BSS;

the first AP ending its ongoing frame exchange sequences at a start of the second rTWT SP in the second BSS;

scheduling a periodic quiet element in the first BSS to be aligned in time with a target beacon transmit time (TBTT) in the second BSS;

scheduling the first rTWT SP in the first BSS to be aligned in time with the TBTT in the second BSS; and the first AP ending its ongoing frame exchange sequences at the TBTT of the second BSS.

6. The method of claim 4, wherein:

the synchronization of the first BSS with the second BSS is performed at a specific time, as indicated in a request from the second AP to the first AP, the request is sent over an ethernet link, a wired link, or via over-the-air signaling, and the synchronization of the first BSS with the second BSS comprises:

the first AP ending its ongoing transmissions at the specific time if the first AP is a transmitter, or the first AP not responding to a control frame initiated by a station in the first BSS if a transmission period by the station is expected to overlap with the specific time.

7. The method of claim 1, wherein multi-AP coordinated transmissions initiated by the second AP with the first AP are performed within a periodic SP associated with a second basic service set (BSS) associated with the second AP, wherein SP parameters comprise at least one of the start time of each period, an inter-SP interval, a persistence value, indication of the periodic SP's use for multi-AP coordination, an identifier of the second AP as the initiator and an identifier of the first AP as a responder.

8. The method of claim 7, wherein the first AP performs synchronization procedures in a first BSS associated with the first AP at the start time of the periodic SP, the synchronization procedures comprising at least one of:

scheduling a periodic quiet element in the first BSS to be aligned in time with the start time of the periodic SP in the second BSS;

scheduling a restricted target wake time (rTWT) SP in the first BSS to be aligned in time with the periodic SP in the second BSS;

scheduling a broadcast target wake time (bTWT) SP in the first BSS to be aligned in time with the periodic SP in the second BSS; and the first AP ending its ongoing frame exchange sequences at the start time of the periodic SP in the second BSS.

9. The method of claim 8, wherein parameters of the rTWT or bTWT SP scheduled by the first AP include at least one of: an indication of the periodic SP's use for multi-AP coordination, the identifier of the second AP as the initiator, the identifier of the first AP as the responder, and an indication of whether non-AP stations are allowed to join the periodic SP as members.

10. A first access point (AP) comprising:

a transceiver; and a processor operably coupled to the transceiver, the processor configured to:

determine, based on one or more conditions placed on performance of multi-AP coordination, whether multi-AP coordination can be performed between the first AP and a second AP of a plurality of APs;

when the one or more conditions is satisfied, perform the multi-AP coordination between the first AP and the second AP; and when the one or more conditions is not satisfied, not perform the multi-AP coordination between the first AP and the second AP, wherein multi-AP coordinated transmissions initiated by either the first AP or the second AP are performed within a common periodic service period (SP), the first AP scheduling a first SP and the second AP scheduling a second SP aligned with the common periodic service period, wherein parameters of each of the first and second SP comprise at least one of a start time of each period, an inter-SP interval, a persistence value, indication of the SP's use for multi-AP coordination, and identifiers of the first and second APs as participants of the multi-AP coordination.

11. The first AP of claim 10, wherein the one or more conditions comprise:

received power at the first AP from the second AP being above a first threshold value;

received power at the first AP from the second AP being below a second threshold value;

a primary channel of the first AP being the same as a primary channel of the second AP; and the primary channel of the first AP being within an operating bandwidth of the second AP.

12. The first AP of claim 10, wherein to determine, based on the one or more conditions placed on performance of multi-AP coordination, whether multi-AP coordination can be performed between the first AP and the second AP of the plurality of APs, the processor is configured to:

indicate a capability to perform multi-AP coordination to the second AP; and indicate requirements to perform multi-AP coordination to the second AP.

13. The first AP of claim 10, wherein the one or more conditions comprise perform synchronization of a first basic service set (BSS) associated with the first AP with a second BSS associated with the second AP, where synchronization involves enhancing a probability of successful preamble detection between the first BSS and the second BSS and successful multi-AP coordination between the first BSS and the second BSS.

14. The first AP of claim 13, wherein the synchronization of the first BSS with the second BSS comprises at least one of:

schedule a first periodic quiet element in the first BSS to be aligned in time with a second periodic quiet element in the second BSS;

schedule a first restricted target wake time (rTWT) SP in the first BSS to be aligned in time with a second rTWT SP in the second BSS;

the first AP ending its ongoing frame exchange sequences at a start of the second rTWT SP in the second BSS;

schedule a periodic quiet element in the first BSS to be aligned in time with a target beacon transmit time (TBTT) in the second BSS;

schedule the first rTWT SP in the first BSS to be aligned in time with the TBTT in the second BSS; and the first AP ending its ongoing frame exchange sequences at the TBTT of the second BSS.

15. The first AP of claim 13, wherein:

the synchronization of the first BSS with the second BSS is performed at a specific time, as indicated in a request from the second AP to the first AP, the request is sent over an ethernet link, a wired link, or via over-the-air signaling, and the synchronization of the first BSS with the second BSS comprises:

the first AP ending its ongoing transmissions at the specific time if the first AP is a transmitter, or the first AP not responding to a control frame initiated by a station in the first BSS if a transmission period by the station is expected to overlap with the specific time.

16. The first AP of claim 10, wherein multi-AP coordinated transmissions initiated by the second AP with the first AP are performed within a periodic SP associated with a second basic service set (BSS) associated with the second AP, wherein SP parameters comprise at least one of the start time of each period, an inter-SP interval, a persistence value, indication of the periodic SP's use for multi-AP coordination, an identifier of the second AP as the initiator and an identifier of the first AP as a responder.

17. The first AP of claim 16, wherein the first AP is configured to perform synchronization procedures in a first BSS associated with the first AP at the start time of the periodic SP, the synchronization procedures comprising at least one of:

schedule a periodic quiet element in the first BSS to be aligned in time with the start time of the periodic SP in the second BSS;

schedule a restricted target wake time (rTWT) SP in the first BSS to be aligned in time with the periodic SP in the second BSS;

schedule a broadcast target wake time (bTWT) SP in the first BSS to be aligned in time with the periodic SP in the second BSS; and the first AP ending its ongoing frame exchange sequences at the start time of the periodic SP in the second BSS.

18. The first AP of claim 17, wherein parameters of the rTWT or bTWT SP scheduled by the first AP include at least one of: an indication of the periodic SP's use for multi-AP coordination, the identifier of the second AP as the initiator, the identifier of the first AP as the responder, and an indication of whether non-AP stations are allowed to join the periodic SP as members.

* * * * *